(12) United States Patent
Krah et al.

(10) Patent No.: US 8,077,147 B2
(45) Date of Patent: Dec. 13, 2011

(54) MOUSE WITH OPTICAL SENSING SURFACE

(75) Inventors: Christoph H. Krah, Los Altos, CA (US); Steve P. Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 794 days.

(21) Appl. No.: 11/375,418

(22) Filed: Mar. 13, 2006

(65) Prior Publication Data

US 2007/0152966 A1    Jul. 5, 2007

Related U.S. Application Data

(60) Provisional application No. 60/755,231, filed on Dec. 30, 2005.

(51) Int. Cl.
*G09G 5/08* (2006.01)
(52) U.S. Cl. ....................................................... 345/163
(58) Field of Classification Search .......... 345/163–166; 348/211
See application file for complete search history.

(56) References Cited

U.S. PATENT DOCUMENTS

| | | |
|---|---|---|
| 3,609,695 A | 9/1971 | Pirkle |
| 3,748,751 A | 7/1973 | Breglia et al. |
| 3,757,322 A | 9/1973 | Barkan et al. |
| 3,825,730 A | 7/1974 | Worthington, Jr. et al. |
| 3,846,826 A | 11/1974 | Mueller |
| 4,014,000 A | 3/1977 | Uno et al. |
| 4,017,848 A | 4/1977 | Tannas, Jr. |
| 4,110,749 A | 8/1978 | Janko et al. |
| 4,146,924 A | 3/1979 | Birk et al. |
| 4,219,847 A | 8/1980 | Pinkney et al. |
| 4,264,903 A | 4/1981 | Bigelow |
| 4,303,856 A | 12/1981 | Serras-Paulet |
| 4,305,071 A | 12/1981 | Bell et al. |
| 4,305,131 A | 12/1981 | Best |
| 4,346,376 A | 8/1982 | Mallos |
| 4,375,674 A | 3/1983 | Thornton |
| 4,396,945 A | 8/1983 | DiMatteo et al. |
| 4,435,835 A | 3/1984 | Sakow et al. |
| 4,475,122 A | 10/1984 | Green |
| 4,484,179 A | 11/1984 | Kasday |
| 4,542,375 A | 9/1985 | Alles et al. |
| 4,561,017 A | 12/1985 | Greene |
| 4,613,942 A | 9/1986 | Chen |
| 4,629,319 A | 12/1986 | Clarke et al. |
| 4,631,525 A | 12/1986 | Serravalle, Jr. |
| 4,631,676 A | 12/1986 | Pugh |
| 4,644,100 A | 2/1987 | Brenner et al. |
| 4,644,326 A | 2/1987 | Villalobos et al. |

(Continued)

FOREIGN PATENT DOCUMENTS

DE    4125049    1/1992

(Continued)

OTHER PUBLICATIONS

"System Service and Troubleshooting Manual", www.dsplib.com/intv/Master, downloaded Dec. 11, 2002.

(Continued)

*Primary Examiner* — Ke Xiao
(74) *Attorney, Agent, or Firm* — Morrison & Foerster LLP

(57) ABSTRACT

A mouse with an extended optical sensing surface is disclosed.

32 Claims, 10 Drawing Sheets

U.S. PATENT DOCUMENTS

| | | | |
|---|---|---|---|
| 4,654,872 A | 3/1987 | Hisano et al. |
| 4,672,364 A | 6/1987 | Lucas |
| 4,686,374 A | 8/1987 | Liptay-Wagner et al. |
| 4,710,760 A | 12/1987 | Kasday |
| 4,719,524 A | 1/1988 | Morishima et al. |
| 4,736,191 A | 4/1988 | Matzke et al. |
| 4,746,770 A | 5/1988 | McAvinney |
| 4,772,028 A | 9/1988 | Rockhold et al. |
| 4,787,040 A | 11/1988 | Ames et al. |
| 4,853,888 A | 8/1989 | Lata et al. |
| 4,866,602 A | 9/1989 | Hall |
| 4,898,555 A | 2/1990 | Sampson |
| 4,917,516 A | 4/1990 | Retter |
| 4,922,236 A | 5/1990 | Heady |
| 4,948,371 A | 8/1990 | Hall |
| 4,988,981 A | 1/1991 | Zimmerman et al. |
| 4,993,806 A | 2/1991 | Clausen et al. |
| 5,045,843 A | 9/1991 | Hansen |
| 5,045,846 A | 9/1991 | Gay et al. |
| 5,072,294 A | 12/1991 | Engle |
| 5,125,077 A | 6/1992 | Hall |
| 5,153,829 A | 10/1992 | Furuya et al. |
| 5,168,531 A | 12/1992 | Sigel |
| 5,179,648 A | 1/1993 | Hauck |
| 5,186,646 A | 2/1993 | Pederson |
| 5,212,555 A | 5/1993 | Stoltz |
| 5,227,985 A | 7/1993 | DeMenthon |
| 5,237,311 A | 8/1993 | Mailey et al. |
| 5,252,951 A | 10/1993 | Tannenbaum et al. |
| 5,328,190 A | 7/1994 | Dart et al. |
| D349,280 S | 8/1994 | Kaneko |
| 5,339,213 A | 8/1994 | O'Callaghan |
| 5,341,133 A | 8/1994 | Savoy et al. |
| 5,355,148 A | 10/1994 | Anderson |
| 5,404,152 A | 4/1995 | Nagai |
| 5,412,189 A | 5/1995 | Cragun |
| 5,414,445 A | 5/1995 | Kaneko et al. |
| 5,418,760 A | 5/1995 | Kawashima et al. |
| 5,424,756 A | 6/1995 | Ho et al. |
| 5,438,331 A | 8/1995 | Gilligan et al. |
| D362,431 S | 9/1995 | Kaneko et al. |
| 5,459,793 A | 10/1995 | Naoi et al. |
| 5,473,343 A | 12/1995 | Kimmich et al. |
| 5,473,344 A | 12/1995 | Bacon et al. |
| 5,483,261 A | 1/1996 | Yasutake |
| 5,488,204 A | 1/1996 | Mead et al. |
| 5,489,940 A * | 2/1996 | Richardson et al. .......... 348/315 |
| 5,495,269 A | 2/1996 | Elrod et al. |
| 5,495,566 A | 2/1996 | Kwatinetz |
| 5,495,576 A | 2/1996 | Ritchey |
| 5,502,514 A | 3/1996 | Vogeley et al. |
| 5,510,806 A | 4/1996 | Busch |
| 5,511,148 A | 4/1996 | Wellner |
| 5,515,079 A | 5/1996 | Hauck |
| 5,528,265 A | 6/1996 | Harrison |
| 5,530,456 A | 6/1996 | Kokubo |
| 5,559,301 A | 9/1996 | Bryan, Jr. et al. |
| 5,559,943 A | 9/1996 | Cyr et al. |
| 5,561,445 A | 10/1996 | Miwa et al. |
| 5,565,887 A | 10/1996 | McCambridge et al. |
| 5,572,239 A | 11/1996 | Jaeger |
| 5,578,817 A | 11/1996 | Bidiville et al. |
| 5,585,823 A | 12/1996 | Duchon et al. |
| 5,594,469 A | 1/1997 | Freeman et al. |
| 5,596,347 A | 1/1997 | Robertson et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,913 A | 3/1997 | Ikematsu et al. |
| 5,649,706 A | 7/1997 | Treat, Jr. et al. |
| D382,550 S | 8/1997 | Kaneko et al. |
| 5,661,505 A | 8/1997 | Livits |
| D385,542 S | 10/1997 | Kaneko et al. |
| 5,686,720 A | 11/1997 | Tullis |
| 5,709,219 A | 1/1998 | Chen et al. |
| 5,712,661 A | 1/1998 | Jaeger |
| 5,726,685 A | 3/1998 | Kuth et al. |
| 5,726,687 A | 3/1998 | Belfiore et al. |
| 5,729,219 A | 3/1998 | Armstrong et al. |
| 5,729,249 A | 3/1998 | Yasutake |
| 5,730,165 A | 3/1998 | Philipp |
| 5,736,975 A | 4/1998 | Lunetta |
| 5,748,185 A | 5/1998 | Stephan et al. |
| 5,751,274 A | 5/1998 | Davis |
| 5,754,890 A | 5/1998 | Holmdahl et al. |
| 5,777,603 A | 7/1998 | Jaeger |
| 5,786,804 A | 7/1998 | Gordon |
| 5,786,818 A | 7/1998 | Brewer et al. |
| 5,805,145 A | 9/1998 | Jaeger |
| 5,805,146 A | 9/1998 | Jaeger et al. |
| 5,808,602 A | 9/1998 | Sellers |
| 5,812,114 A | 9/1998 | Loop |
| 5,825,352 A | 10/1998 | Bisset et al. |
| 5,825,353 A | 10/1998 | Will |
| 5,828,364 A | 10/1998 | Siddiqui |
| 5,831,601 A | 11/1998 | Vogeley et al. |
| 5,835,079 A | 11/1998 | Shieh |
| 5,838,304 A | 11/1998 | Hall |
| 5,841,425 A | 11/1998 | Zenz |
| 5,841,426 A | 11/1998 | Dodson et al. |
| 5,841,428 A | 11/1998 | Jaeger et al. |
| D402,281 S | 12/1998 | Ledbetter et al. |
| 5,850,213 A | 12/1998 | Imai et al. |
| 5,856,822 A | 1/1999 | Du et al. |
| 5,859,631 A | 1/1999 | Bergman et al. |
| 5,867,149 A | 2/1999 | Jaeger |
| 5,871,251 A | 2/1999 | Welling et al. |
| 5,880,411 A | 3/1999 | Gillespie et al. |
| 5,883,619 A | 3/1999 | Ho et al. |
| 5,889,236 A | 3/1999 | Gillespie et al. |
| 5,903,229 A | 5/1999 | Kishi |
| 5,907,152 A | 5/1999 | Dändliker et al. |
| 5,907,318 A | 5/1999 | Medina |
| 5,909,211 A | 6/1999 | Combs et al. |
| 5,914,706 A | 6/1999 | Kono |
| 5,923,319 A | 7/1999 | Bishop et al. |
| 5,933,134 A * | 8/1999 | Shieh ............................ 345/173 |
| 5,936,613 A | 8/1999 | Jaeger et al. |
| 5,949,345 A | 9/1999 | Beckert et al. |
| 5,956,019 A | 9/1999 | Bang et al. |
| 5,959,611 A | 9/1999 | Smailagic et al. |
| 5,977,867 A | 11/1999 | Blouin |
| 5,982,302 A | 11/1999 | Ure |
| 5,982,352 A | 11/1999 | Pryor |
| 5,982,353 A | 11/1999 | Gallery et al. |
| 5,982,355 A | 11/1999 | Jaeger et al. |
| 5,991,431 A | 11/1999 | Borza et al. |
| 5,995,104 A | 11/1999 | Kataoka et al. |
| 5,999,166 A | 12/1999 | Rangan |
| 6,002,389 A | 12/1999 | Kasser et al. |
| 6,005,299 A | 12/1999 | Hengst |
| 6,005,611 A * | 12/1999 | Gullichsen et al. ........ 348/211.6 |
| 6,008,800 A | 12/1999 | Pryor |
| 6,013,956 A | 1/2000 | Anderson, Jr. |
| 6,031,518 A | 2/2000 | Adams et al. |
| 6,049,328 A | 4/2000 | Vanderheiden |
| 6,054,990 A | 4/2000 | Tran |
| 6,057,540 A | 5/2000 | Gordon et al. |
| 6,061,177 A | 5/2000 | Fujimoto |
| 6,064,370 A | 5/2000 | Wang et al. |
| 6,066,075 A | 5/2000 | Poulton |
| 6,075,533 A | 6/2000 | Chang |
| 6,084,574 A | 7/2000 | Bidiville |
| 6,111,563 A | 8/2000 | Hines |
| 6,115,028 A | 9/2000 | Balakrishnan et al. |
| 6,124,587 A | 9/2000 | Bidiville et al. |
| 6,128,006 A | 10/2000 | Rosenberg et al. |
| 6,130,664 A | 10/2000 | Suzuki |
| 6,154,201 A | 11/2000 | Levin et al. |
| 6,163,312 A | 12/2000 | Furuya |
| 6,166,721 A | 12/2000 | Kuroiwa et al. |
| 6,175,610 B1 | 1/2001 | Peter |
| 6,179,496 B1 | 1/2001 | Chou |
| 6,181,322 B1 | 1/2001 | Nanavati |
| 6,188,389 B1 | 2/2001 | Yen |
| 6,188,391 B1 | 2/2001 | Seely et al. |
| 6,188,393 B1 | 2/2001 | Shu |

| | | |
|---|---|---|
| 6,191,774 B1 | 2/2001 | Schena et al. |
| 6,198,473 B1 | 3/2001 | Armstrong |
| 6,211,861 B1 | 4/2001 | Rosenberg et al. |
| 6,219,035 B1 | 4/2001 | Skog |
| 6,219,038 B1 | 4/2001 | Cho |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,232,957 B1 | 5/2001 | Hinckley |
| D443,616 S | 6/2001 | Fisher et al. |
| 6,243,078 B1 | 6/2001 | Rosenberg |
| 6,256,011 B1 | 7/2001 | Culver |
| 6,256,020 B1 | 7/2001 | Pabon et al. |
| 6,262,717 B1 | 7/2001 | Donohue et al. |
| 6,266,050 B1 | 7/2001 | Oh et al. |
| 6,278,441 B1 | 8/2001 | Gouzman et al. |
| 6,297,795 B1 | 10/2001 | Kato et al. |
| 6,310,610 B1 | 10/2001 | Beaton et al. |
| 6,323,843 B2 | 11/2001 | Giles et al. |
| 6,323,845 B1 | 11/2001 | Robbins |
| 6,323,846 B1 | 11/2001 | Westerman et al. |
| 6,326,956 B1 | 12/2001 | Jaeger et al. |
| 6,333,734 B1 | 12/2001 | Rein |
| 6,339,748 B1 | 1/2002 | Hiramatsu |
| 6,340,800 B1 | 1/2002 | Zhai et al. |
| D454,568 S | 3/2002 | Andre et al. |
| 6,356,524 B2 | 3/2002 | Aratani |
| 6,369,797 B1 | 4/2002 | Maynard |
| 6,373,470 B1 | 4/2002 | Andre et al. |
| 6,377,530 B1 | 4/2002 | Burrows |
| 6,392,632 B1 | 5/2002 | Lee |
| 6,392,634 B1 | 5/2002 | Bowers et al. |
| 6,392,636 B1 | 5/2002 | Ferrari et al. |
| 6,396,477 B1 * | 5/2002 | Hinckley et al. .............. 345/163 |
| 6,412,961 B1 * | 7/2002 | Hicks ............................ 359/846 |
| 6,414,672 B2 | 7/2002 | Rekimoto et al. |
| 6,421,042 B1 | 7/2002 | Omura et al. |
| 6,421,046 B1 | 7/2002 | Edgren |
| 6,429,846 B2 | 8/2002 | Rosenberg et al. |
| 6,429,852 B1 | 8/2002 | Adams et al. |
| 6,433,780 B1 | 8/2002 | Gordon et al. |
| 6,441,806 B1 | 8/2002 | Jaeger |
| 6,441,807 B1 | 8/2002 | Yamaguchi |
| 6,457,834 B1 | 10/2002 | Cotton et al. |
| 6,469,693 B1 | 10/2002 | Chiang et al. |
| 6,478,432 B1 | 11/2002 | Dyner |
| 6,481,851 B1 | 11/2002 | McNelley et al. |
| 6,489,947 B2 | 12/2002 | Hesley et al. |
| 6,501,515 B1 | 12/2002 | Iwamura |
| 6,505,088 B1 | 1/2003 | Simkin et al. |
| 6,513,717 B2 | 2/2003 | Hannigan |
| 6,545,665 B2 | 4/2003 | Rodgers |
| 6,545,670 B1 | 4/2003 | Pryor |
| 6,559,830 B1 | 5/2003 | Hinckley et al. |
| 6,563,492 B1 | 5/2003 | Furuya |
| 6,570,584 B1 | 5/2003 | Cok et al. |
| 6,587,091 B2 | 7/2003 | Serpa |
| 6,587,093 B1 | 7/2003 | Shaw et al. |
| 6,611,252 B1 | 8/2003 | DuFaux |
| 6,636,197 B1 | 10/2003 | Goldenberg et al. |
| 6,639,584 B1 | 10/2003 | Li |
| 6,650,975 B2 | 11/2003 | Ruffner |
| 6,677,927 B1 | 1/2004 | Bruck et al. |
| 6,677,934 B1 | 1/2004 | Blanchard |
| 6,686,904 B1 | 2/2004 | Sherman et al. |
| 6,690,365 B2 | 2/2004 | Hinckley et al. |
| 6,690,387 B2 | 2/2004 | Zimmerman et al. |
| 6,697,721 B2 | 2/2004 | Arlinsky |
| 6,700,564 B2 | 3/2004 | McLoone et al. |
| 6,703,550 B2 | 3/2004 | Chu |
| 6,703,599 B1 | 3/2004 | Casebolt et al. |
| 6,707,027 B2 | 3/2004 | Liess et al. |
| 6,717,569 B1 | 4/2004 | Gruhl et al. |
| 6,724,366 B2 | 4/2004 | Crawford |
| 6,724,817 B1 | 4/2004 | Simpson et al. |
| 6,727,889 B2 | 4/2004 | Shaw |
| 6,738,045 B2 | 5/2004 | Hinckley et al. |
| 6,740,860 B2 | 5/2004 | Kobayashi |
| 6,762,751 B2 | 7/2004 | Kuan |
| 6,781,570 B1 | 8/2004 | Arrigo et al. |
| 6,788,288 B2 | 9/2004 | Ano |
| 6,791,533 B2 | 9/2004 | Su |
| 6,795,056 B2 | 9/2004 | Norskog et al. |
| 6,795,057 B2 | 9/2004 | Gordon |
| 6,816,150 B2 | 11/2004 | Casebolt et al. |
| 6,828,958 B2 | 12/2004 | Davenport |
| 6,833,825 B1 | 12/2004 | Farag et al. |
| 6,844,871 B1 | 1/2005 | Hinckley et al. |
| 6,844,872 B1 | 1/2005 | Farag et al. |
| 6,848,014 B2 | 1/2005 | Landron et al. |
| 6,865,718 B2 | 3/2005 | Levi |
| 6,896,375 B2 | 5/2005 | Peterson et al. |
| 6,950,094 B2 | 9/2005 | Gordon et al. |
| 6,972,401 B2 | 12/2005 | Akitt et al. |
| 6,995,744 B1 | 2/2006 | Moore et al. |
| 7,002,749 B2 | 2/2006 | Kremen |
| 7,015,894 B2 | 3/2006 | Morohoshi |
| 7,030,861 B1 * | 4/2006 | Westerman et al. .......... 345/173 |
| 7,046,230 B2 | 5/2006 | Zadesky et al. |
| 7,051,291 B2 | 5/2006 | Sciammarella et al. |
| 7,061,468 B2 | 6/2006 | Tiphane et al. |
| 7,079,114 B1 | 7/2006 | Smith et al. |
| 7,084,859 B1 | 8/2006 | Pryor |
| 7,098,891 B1 | 8/2006 | Pryor |
| 7,113,196 B2 | 9/2006 | Kerr |
| 7,119,792 B1 | 10/2006 | Andre et al. |
| 7,142,193 B2 | 11/2006 | Hayama et al. |
| 7,164,412 B2 | 1/2007 | Kao |
| 7,168,047 B1 | 1/2007 | Huppi |
| 7,170,488 B2 | 1/2007 | Kehlstadt et al. |
| 7,184,064 B2 | 2/2007 | Zimmerman et al. |
| 7,233,318 B1 | 6/2007 | Farag |
| 7,239,800 B2 | 7/2007 | Bilbrey |
| 7,358,963 B2 | 4/2008 | Low et al. |
| 7,417,681 B2 | 8/2008 | Lieberman et al. |
| 7,466,843 B2 | 12/2008 | Pryor |
| 7,489,303 B1 | 2/2009 | Pryor |
| 7,495,659 B2 | 2/2009 | Marriott et al. |
| 7,663,607 B2 | 2/2010 | Hotelling et al. |
| 7,714,849 B2 | 5/2010 | Pryor |
| 7,808,479 B1 | 10/2010 | Hotelling et al. |
| 2001/0011991 A1 | 8/2001 | Wang et al. |
| 2001/0012001 A1 | 8/2001 | Rekimoto et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0030665 A1 | 3/2002 | Ano |
| 2002/0033848 A1 | 3/2002 | Sciammarella et al. |
| 2002/0063688 A1 | 5/2002 | Shaw et al. |
| 2002/0089545 A1 | 7/2002 | Montalcini |
| 2002/0093487 A1 | 7/2002 | Rosenberg |
| 2002/0118169 A1 | 8/2002 | Hinckley et al. |
| 2002/0118174 A1 | 8/2002 | Rodgers |
| 2002/0130839 A1 | 9/2002 | Wallace et al. |
| 2002/0130841 A1 | 9/2002 | Scott |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0180701 A1 | 12/2002 | Hayama et al. |
| 2003/0002246 A1 | 1/2003 | Kerr |
| 2003/0043121 A1 | 3/2003 | Chen |
| 2003/0050092 A1 | 3/2003 | Yun |
| 2003/0072077 A1 | 4/2003 | Peterson et al. |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0095096 A1 | 5/2003 | Robbin et al. |
| 2003/0098851 A1 | 5/2003 | Brink |
| 2003/0107551 A1 | 6/2003 | Dunker |
| 2003/0107552 A1 | 6/2003 | Lu |
| 2003/0184517 A1 | 10/2003 | Senzui et al. |
| 2004/0046741 A1 * | 3/2004 | Low et al. ...................... 345/166 |
| 2004/0113886 A1 * | 6/2004 | Lee ................................ 345/156 |
| 2004/0141157 A1 | 7/2004 | Ramachandran et al. |
| 2004/0156192 A1 | 8/2004 | Kerr et al. |
| 2004/0183782 A1 * | 9/2004 | Shahoian et al. ............. 345/163 |
| 2004/0239622 A1 | 12/2004 | Proctor et al. |

| | | | |
|---|---|---|---|
| 2004/0242269 A1 | 12/2004 | Fadell | |
| 2004/0252109 A1 | 12/2004 | Trent et al. | |
| 2005/0064936 A1 | 3/2005 | Pryor | |
| 2005/0084138 A1 | 4/2005 | Inkster et al. | |
| 2005/0110768 A1 | 5/2005 | Marriott et al. | |
| 2005/0122308 A1 | 6/2005 | Bell et al. | |
| 2005/0134565 A1* | 6/2005 | Hong ............................ | 345/163 |
| 2005/0228320 A1 | 10/2005 | Klinghult | |
| 2005/0259077 A1 | 11/2005 | Adams et al. | |
| 2006/0026521 A1 | 2/2006 | Hotelling et al. | |
| 2006/0026535 A1 | 2/2006 | Hotelling et al. | |
| 2006/0047509 A1 | 3/2006 | Ding et al. | |
| 2006/0161870 A1 | 7/2006 | Hotelling et al. | |
| 2006/0197753 A1 | 9/2006 | Hotelling | |
| 2006/0227099 A1 | 10/2006 | Han et al. | |
| 2006/0274042 A1 | 12/2006 | Krah et al. | |
| 2007/0229424 A1 | 10/2007 | Hayashi et al. | |
| 2007/0296688 A1 | 12/2007 | Nakamura et al. | |
| 2008/0018612 A1 | 1/2008 | Nakamura et al. | |
| 2008/0024463 A1 | 1/2008 | Pryor | |
| 2008/0029691 A1 | 2/2008 | Han | |
| 2008/0088587 A1 | 4/2008 | Pryor | |
| 2008/0129707 A1 | 6/2008 | Pryor | |
| 2008/0150898 A1 | 6/2008 | Low | |
| 2008/0211779 A1 | 9/2008 | Pryor | |
| 2009/0267902 A1 | 10/2009 | Nambu et al. | |
| 2009/0267921 A1 | 10/2009 | Pryor | |
| 2009/0273563 A1 | 11/2009 | Pryor | |
| 2009/0273574 A1 | 11/2009 | Pryor | |
| 2009/0273575 A1 | 11/2009 | Pryor | |
| 2009/0300531 A1 | 12/2009 | Pryor | |
| 2009/0322499 A1 | 12/2009 | Pryor | |
| 2010/0001978 A1 | 1/2010 | Lynch | |
| 2010/0231506 A1 | 9/2010 | Pryor | |

FOREIGN PATENT DOCUMENTS

| | | | |
|---|---|---|---|
| DE | 19722636 | | 12/1998 |
| DE | 10022537 | | 11/2000 |
| DE | 10201193 | | 7/2003 |
| EP | 0 498 540 | A2 | 1/1992 |
| EP | 0653725 | | 5/1995 |
| EP | 0768619 | | 4/1997 |
| EP | 0795837 | | 9/1997 |
| EP | 0 880 Q91 | A2 | 11/1998 |
| EP | 1 026 713 | A1 | 8/2000 |
| JP | 63-167923 | A | 7/1988 |
| JP | 03/237520 | | 10/1991 |
| JP | 05-297979 | A | 11/1993 |
| JP | 07-230352 | A | 8/1995 |
| JP | 07-319001 | | 12/1995 |
| JP | 63106826 | A | 5/1998 |
| JP | 10326149 | A | 12/1998 |
| JP | 11-194863 | | 7/1999 |
| JP | 11-194872 | | 7/1999 |
| JP | 11-194883 | | 7/1999 |
| JP | 2000-163031 | A | 6/2000 |
| JP | 2000-215549 | | 8/2000 |
| JP | 2000242424 | | 9/2000 |
| JP | 2001-051790 | | 2/2001 |
| JP | EP 1241558 | | 9/2002 |
| JP | 2002-342033 | A | 11/2002 |
| JP | 2003280807 | | 2/2003 |
| TW | 431607 | | 4/2001 |
| WO | WO 90/05972 | | 5/1990 |
| WO | WO 94/17494 | | 8/1994 |
| WO | WO 98/14863 | | 4/1998 |
| WO | WO 99/26330 | | 5/1999 |
| WO | WO 99/49443 | | 9/1999 |
| WO | WO 00/39907 | | 7/2000 |
| WO | WO 02052494 | | 7/2002 |
| WO | WO 03077110 | | 9/2003 |
| WO | WO-2004/091956 | A2 | 10/2004 |
| WO | WO-2004/091956 | A3 | 10/2004 |
| WO | WO-2005/026938 | A2 | 3/2005 |
| WO | WO 2006/132817 | | 12/2006 |
| WO | WO-2007/034591 | A1 | 3/2007 |
| WO | WO-2007/035491 | A1 | 3/2007 |
| WO | WO-2007/112742 | A1 | 10/2007 |
| WO | WO-2008/045665 | A1 | 4/2008 |
| WO | WO-2010/002900 | A1 | 1/2010 |
| WO | WO-2010/135478 | A2 | 11/2010 |

OTHER PUBLICATIONS

Apple Computer, Inc., "Apple Pro Mouse," Jul. 2000, Apple Pro Mouse Design Innovations product specification, pp. 1-11.

David Nagel, "More Details on the New Pro Keyboard and Button-Less Mouse," Jul. 2000, http://www.creativemac.com/HTM/News/07_00/detailskeyboardmouse.htm pp. 1-2.

John Siracusa, "MacWorld Expo NY 2000," Jul. 2000, http://www.arstechnic.com/wanderdesk/3q00/macworld2k/mwny-2.html pp. 1-6.

Microsoft Inc., "Scroll and zoom on a Microsoft Excel sheet by using the Microsoft Intellimouse pointing device" 1999, pp. 1-3.

"About Quicktip®" www.logicad3d.com/docs/qt.html, downloaded Apr. 8, 2002.

"OEM Touchpad Modules" website www.glidepoint.com/sales/modules.index.shtml, downloaded Feb. 13, 2002.

"Product Overview—ErgoCommander®", www.logicad3d.com/products/ErgoCommander.htm, downloaded Apr. 8, 2002.

"Product Overview—SpaceMouse® Classic", www.logicad3d.com/products/Classic.htm, downloaded Apr. 8, 2002.

Sylvania, "Intellivision™ Intelligent Television Master Component Service Manual," pp. 1, 2 and 8, 1979.

Gadgetboy, "Point and click with the latest mice", CNETAsia Product Review, www.asia.cnet.com/reviews...are/gadgetboy/0,39001770,38023590,00.htm, downloaded Dec. 5, 2001.

Tessler et al. "Touchpads Three new input devices", website www.macworld.com/1996/02/review/1806.html, download Feb. 13, 2002.

"Synaptics Tough Pad Interfacing Guide" Second Edition, Mar. 25, 1998, Synaptics, Inc. San Jose, CA, pp. 1 to 90.

Fiore, Andrew, "Zen Touchpad", Cornell University, May 2000.

Flaminio, Michael, "IntelliMouse Explorer", IGM Review, Oct. 4, 1999.

Grevstad, Eric, "Microsoft Wireless IntelliMouse Explorer Review The Ultimate Pointing Machine", HardwareCentral Review, Jun. 24, 2003.

Grevstad, Eric, "Microsoft Wireless IntelliMouse Explorer Review The Ultimate Pointing Machine", HardwareCentral Review, Oct. 9, 2001.

Dreier, Troy, "The Comfort Zone", PC Magazine, Mar. 12, 2002.

U.S. Appl. No. 10/654,108, filed Sep. 2, 2003.

U.S. Appl. No. 29/231,465, filed Jun. 3, 2005.

U.S. Appl. No. 60/364,400, filed Mar. 13, 2002 (expired).

"Apple Unveils Optical Mouse and New Pro Keyboard," Press Release, Jul. 19, 2000.

"Der Klangmeister," Connect Magazine, Aug. 1998.

Bang & Olufsen Telecom a/s, "BeoCom 6000 User Guide 2000".

BeoCom 6000, Sales Training Brochure, date unknown.

Chapweske, Adam, "PS/2 Mouse/Keyboard Protocol", 1999, http://panda.cs.ndsu.nodak.edu/~achapwes/PICmicro/PS2/ps2.htm.

De Meyer, Kevin, Crystal Optical Mouse, Feb. 14, 2002, Heatseekerz, Web Article 19.

Ken Hinckley et al. "Touch-Sensing Input Devices" CHI 1999 pp. 223-230.

Letter re: Bang & Olufsen A/S, by David Safran, Nixon Peabody, LLP, May 21, 2004.

Photographs of Innovations 2000 Best of Show award presented at the 2000 International CES Innovations 2000 Design & Enginering Showcase, 1 pg.

International Search Report from related application No. PCT/US2006/020341 dated Jun. 12, 2007.

EPO Form 1507 in related EP Application No. 02761784.4 dated Nov. 19, 2004.

"Neuros MP3 Digital Audio Computer", www.neurosaudio.com, downloaded Apr. 9, 2003.

Bales, J.W. et al. (Apr. 1981). "Marking Parts to Aid Robot Vision," NASA Technical Paper 1819, 37 pages.

Bang & Olufsen Telecom A/S. (2000). "BeoCom 6000 User Guide and Sales Training Brochure Cover Sheets," 53 pages.

Final Office Action mailed Nov. 12, 2009, for U.S. Appl. No. 11/349,350, filed Feb. 8, 2006, nine pages.
Final Office Action mailed Sep. 2, 2010, for U.S. Appl. No. 11/272,868, filed Nov. 15, 2005, nine pages.
Gizmodo. (2007). "Logitech's MX Air Is No Longer Vapor," Gizmodo Australia, located at http://www.gizmodo.com.au/2007/07/logitechs_mx_air_is_no_longer.html, last visited on Jan. 11, 2008, two pages.
International Search Report mailed Aug. 28, 2007, for PCT Application No. PCT/US2004/009701, filed Mar. 31, 2004, one page.
International Search Report mailed Nov. 9, 2010, for PCT Application No. PCT/US2009/049270, 11 pages.
Letter re: Bang & Olufsen a/s by David Safran, Nixon Peabody, LLP, May 21, 2004, with BeoCom 6000 Sales Training Brochure, seven pages.
Mehta, N. (Oct. 1982). "A Flexible Human Machine Interface," a Thesis Submitted in Conformity with the Requirements for the Degree of Master of Applied Science in the University of Toronto, 81 pages.
Non-Final Office Action mailed Jan. 6, 2009, for U.S. Appl. No. 11/349,350, filed Feb. 8, 2006, 10 pages.
Non-Final Office Action mailed Mar. 5, 2009, for U.S. Appl. No. 11/272,868, filed Nov. 15, 2005, 15 pages.
Non-Final Office Action mailed Dec. 7, 2009, for U.S. Appl. No. 11/272,868, filed Nov. 15, 2005, seven pages.
Non-Final Office Action mailed Jul. 29, 2010, for U.S. Appl. No. 11/980,721, filed Oct. 31, 2007, nine pages.
Non-Final Office Action mailed Aug. 2, 2010, for U.S. Appl. No. 11/980,722, filed Oct. 31, 2007, five pages.
Non-Final Office Action mailed Sep. 17, 2010, for U.S. Appl. No. 11/832,134, filed Aug. 1, 2007, 26 pages.
U.S. Appl. No. 11/272,868, filed Nov. 15, 2005, by Pryor.
U.S. Appl. No. 11/349,350, filed Feb. 8, 2006, by Pryor.
U.S. Appl. No. 11/878,024, filed Jul. 20, 2007, by Pryor.
U.S. Appl. No. 90/010,571, filed Jun. 10, 2009, by Pryor.
Non-Final Office Action mailed Dec. 17, 2010, for U.S. Appl. No. 12/030,776, filed Feb. 13, 2008, six pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action mailed Mar. 9, 2011, for U.S. Appl. No. 11/980,722, filed Oct. 31, 2007, 11 pages.
Final Office Action mailed Apr. 20, 2011, for U.S. Appl. No. 12/030,776, filed Feb. 13, 2008, eight pages.
Non-Final Office Action mailed Jul. 19, 2011, for U.S. Appl. No. 11/980,722, filed Oct. 31, 2007, 12 pages.

\* cited by examiner

MOUSE WITH OPTICAL SENSING SURFACE

CROSS REFERENCE TO RELATED APPLICATIONS

This application claims priority benefit of U.S. Provisional Application No. 60/755,231, filed Dec. 30, 2005, and entitled "MOUSE WITH OPTICAL SENSING SURFACE" which is hereby incorporated herein by reference.

This application is related to the following applications, all of which are herein incorporated by reference:

U.S. patent application Ser. No. 10/238,380, titled "MOUSE HAVING AN OPTICALLY-BASED SCROLLING FEATURE", filed Sep. 9, 2002;

U.S. patent application Ser. No. 10/157,343, titled "MOUSE HAVING A BUTTON-LESS PANNING AND SCROLLING SWITCH", filed May 28, 2002;

U.S. patent application Ser. No. 10/654,108, titled "AMBIDEXTROUS MOUSE", filed Sep. 2, 2003;

U.S. patent application Ser. No. 11/144,345, titled "MOUSE WITH IMPROVED INPUT MECHANISMS", filed Jun. 3, 2005;

U.S. patent application Ser. No. 10/903,964, titled "GESTURES FOR TOUCH SENSITIVE INPUT DEVICES", filed Jul. 30, 2004; and U.S. patent application Ser. No. 10/840,862, titled "MULTIPOINT TOUCHSCREEN", filed May 6, 2004.

BACKGROUND OF THE INVENTION

1. Field of the Invention

The present invention relates generally to computer mice. More particularly, the present invention relates to mice with improved input mechanisms.

2. Description of the Related Art

Most computer systems, as for example general purpose computers such as portable computers and desktop computers, receive input from a user via a mouse. As is generally well known, the mouse allows a user to move an input pointer and to make selections in a graphical user interface (GUI). The mouse generally includes a trackball, which is located on the underside of the mouse and which rolls when the mouse moves thus translating the motion of the users hand into signals that the computer system can use. The movement of the trackball generally corresponds to the movement of the input pointer in the GUI. That is, by positioning the mouse on a desktop and moving it thereon, the user can move the input pointer in similar directions in the GUI. An optical sensor may alternatively be used to track the movement of the mouse.

Conventional mice also include one or two mechanical buttons for data selection and command execution. The mechanical buttons are disposed near the top front portion of the mouse where they are easily accessible to a users fingers. In some mice, a single mechanical button is placed in the middle of the mouse while in other mice, two mechanical buttons are placed on the left and right side of the mouse. In either case, the mechanical buttons typically include button caps that pivot relative to a fixed top back portion of the mouse in order to provide a mechanical clicking action. When pressed, the button caps come down on switches located underneath the button caps thereby generating button event signals. The mice may additionally include a vertical scroll wheel. The scroll wheel allows a user to move through documents by simply rolling the wheel forward or backward. The scroll wheel is typically positioned between the right and left mechanical buttons at the front top portion of the mouse.

The unibody mouse is another type of mouse. Unlike the conventional mouse, the unibody mouse does not include any mechanical buttons thereby making it more elegant than the conventional mouse (e.g., no surface breaks or lines). The unibody mouse includes a base and a top member that acts like a button and that forms the entire top surface of the mouse. The top member pivots relative to the base in order to provide a clicking action. In most cases, the top member moves around a pivot located towards the back of the mouse so that the top member can pivot forward and downward. When pivoted in this manner, the top member activates a switch, which causes the microcontroller in the mouse to send a button event signal to the host computer. The Apple Mouse manufactured by Apple Computer, Inc., of Cupertino, Calif. is one example of a unibody mouse.

Although mice such as these work well, improvements to form, feel and functionality are still desired. For example, more elegant ways to provide inputs through the mouse are desired.

SUMMARY OF THE INVENTION

The invention relates, in one embodiment, to a configurable mouse with an extended sensing surface, which provides the mouse a customizable, programmable or adaptable way of generating inputs. The mouse includes an arbitrarily shaped grippable member having a 3D shape. The mouse also includes a position detection mechanism that detects the movement of the mouse along a surface. The mouse further includes a multipoint touch detection mechanism that detects one or more objects that are contacting or in close proximity to a substantially large portion of the grippable member. The mouse additionally includes a controller for processing signals generated by the position detection mechanism and multipoint touch detection mechanism.

The invention relates, in another embodiment, to a method of operating a mouse. The method includes obtaining images of a hand as it interacts with any portion of an arbitrarily shaped mouse housing. The method also includes obtaining touch patterns for each image. The method further includes extracting control information from the resulting touch patterns. The method additionally includes controlling some aspect of a host device based on the control information.

The invention relates, in another embodiment, to a computer mouse. The computer mouse includes a mouse housing for enclosing mouse electronics and including a top shell that is connected to a base. The base is embodied as a flat member capable of traveling across a flat surface. The top shell is embodied as a single 3D shaped member that fits inside a user's hand and that is optically transmissive. The base defines the bottom surface of the mouse. The top shell defines the top, front, back and side surfaces of the mouse. The mouse also includes a mouse tracking unit for tracking movements of the mouse along a flat surface. The mouse further includes an optical image system for imaging a substantially large portion of the 3D shaped top shell. The optical imaging system includes an illumination source for illuminating the 3D shaped top shell, an image sensor arrangement for imaging the 3D shaped top shell when the 3D shaped top shell is illuminated, and a wide angle lens assembly that allows the substantially large portion of the 3D shaped top shell to be imaged by the image sensor arrangement. The illumination source includes one or more light sources. The image sensor arrangement includes one or more image sensors. The mouse additionally includes a controller operatively coupled to the mouse tracking unit and optical imaging system, and configured to control the operations of the mouse tracking unit and the optical imaging system. The controller includes a mouse tracking module associated with the mouse tracking unit and an optical sensing module associated with the optical imaging system.

The invention relates, in another embodiment, to a method of inputting from a mouse into a host device. The method includes imaging the entire or substantially large portion of a 3D shaped top shell of a mouse. The method also includes mapping the 3D image to flat space. The method further includes segmenting the flat space image into one or more features, each of which represents a discrete touch on the surface of the top shell. The method additionally includes calculating contact patch parameters for each of the features. Moreover, the method includes sending the contact patch parameters to the host device so that actions can be performed base on the contact patch parameters.

The invention relates, in another embodiment, to a mouse. The mouse includes a housing forming a grippable surface and a sliding surface. The mouse also includes a mouse tracking unit built into the sliding surface. The mouse further includes an input mechanism built into the grippable surface. The input mechanism includes a touch sensitive protruding member that is supported by a force feedback unit that is attached to the housing. The force feedback unit produces force feedback at the touch sensitive protruding member in response to inputs generated at the touch sensitive surface.

BRIEF DESCRIPTION OF THE DRAWINGS

The invention may best be understood by reference to the following description taken in conjunction with the accompanying drawings in which.

DETAILED DESCRIPTION OF THE INVENTION

Figure 1:
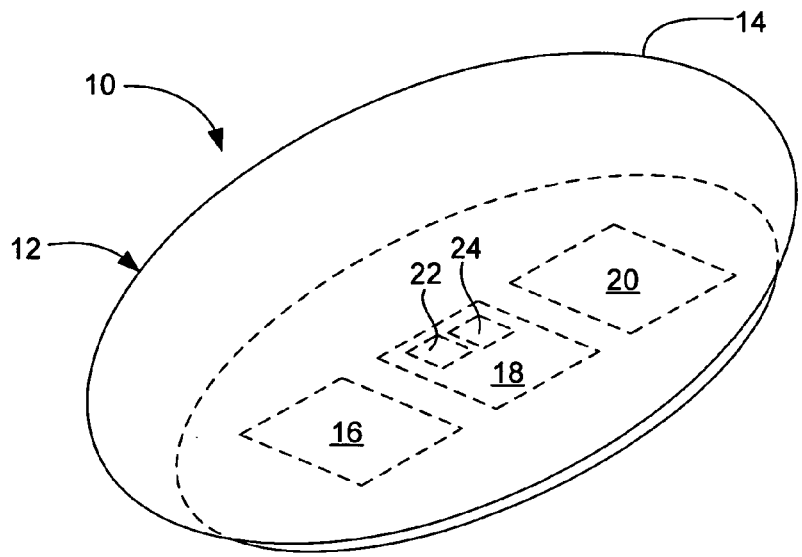
FIG. 1 is a perspective view of a configurable mouse, in accordance with one embodiment of the present invention.

There exist today many input devices that utilize touch sensing means and further optical sensing means. For example, some mice include light sources and light detectors for detecting fingers on the top surface of the mouse. Unfortunately, however, because of the complex shape of most mice and the limited availability of real estate due to buttons and other features of the mouse, the detectors are constrained to small localized sensing areas of the top surface. That is, they do not sense the entire grippable surface, but rather a very small portion of the grippable surface usually the size of a finger or two. As should be appreciated, most mice are shaped to fit inside a users hand and are therefore dome shaped. The unique dome shape of the mouse presents problems when trying to image the entire top surface or a substantially large portion of the top surface (keeping the area small produces a relatively flat surface which is easier to detect than a curved 3D surface).

Moreover, the sensing area only detects a single point rather than multiple points. If multiple fingers are placed in the sensing area, the detector does not generate two distinct signals but rather one.

In addition, while mice have included features such as buttons and scroll wheels they have not provided extended features such as gesture recognition. Up to this point, mice have only been able to perform mouse gestures by moving the mouse via mouse tracking. Mice have not included the ability to receive hand gestures on the grippable surface of the mouse in addition to providing mouse tracking.

In accordance with one embodiment, a mouse that includes standard mouse tracking features is configured with an optical imaging system capable of detecting the presence of one or more objects over the entire or substantially large portion of the grippable surface of the mouse even when the grippable surface is an arbitrary shape such as a dome. Generally speaking, the optical imaging system is configured to continuously image the grippable surface of the mouse in order to determine if a user's hand (e.g., fingers, palm) is contacting or in close proximity some portion of the grippable surface. The images as well as changes to the images can be analyzed to provide various inputs to a host device. The inputs can be used to perform various actions including for example button events, scrolling events, modal events, gesture events, tracking events, etc.

In one embodiment, the mouse includes an optically transmissive top shell that is connected to a base. The base and top shell cooperate to form the housing of the mouse and therefore they work together to fully enclose the mouse electronics therein. The base provides a structure for supporting the top shell and mouse electronics and sliding the mouse along a surface. The top shell provides a structure for placement of the user's hand when sliding the mouse along the surface (e.g., provides a structure for gripping and manipulating the mouse). The mouse also includes an illumination source disposed inside the top shell and base. The illumination source is configured to illuminate the entire or a substantially large portion of the top shell. The mouse additionally includes a camera for imaging the entire or a substantially large portion of the top shell when the top shell is illuminated. During operation, points or multiple points of contact are generally imaged as points of light due to reflection whereas all other areas are imaged as dark areas. By analyzing sequential images, characteristics associated with the one or more points of contact can be used to drive inputs.

The camera may further include a wide angle lens so that the entire or substantially large portion of the top shell can be imaged by the image sensor. The lens collects light that is reflected from the substantially large surface of the top shell as for example when one or more objects such as fingers and/or palm are placed on the top shell (e.g., the fingers and palms act like a reflectors that send a portion of the light back inside the mouse). After collecting the light, the wide angle lens then redirects the light onto an image sensor. The image sensor receives the light and forms an image of the object relative to the top shell. Generally speaking, the wide angle lens helps allow the 3D top shell to be imaged by a 2D sensor.

Because of the arbitrary shape of the top shell, the limited field of view of the image sensor, and/or the low profile of the mouse (e.g., sensor is proximate the surface it is trying to image), this arrangement may produce a warped or distorted image. Therefore, the mouse may further include a controller such as a digital signal processor (DSP) that corrects the distorted image. For example, the controller may perform a reverse warping transform that converts the warped image to an unwarped image. The controller may further be configured to analyze the image in order to determine and differentiate multiple points of contact at the top shell. The points of contacts as well as their characteristics (e.g., location, size, etc.) can be used to drive inputting. For example, the existence of a point or points or changes between a point or points may be used to perform various actions in a host device. This is sometimes referred to as multipoint processing.

The signals generated by the optical imaging system can be used in a variety of ways.

In one embodiment, the signals generated by the imaging system are used initiate button events. Conventionally, in order to create button events, the movement of the top shell actuates one or more switches located inside the unibody mouse. In the arrangement described above, the switches can be removed and the button events can be implemented via the optical image system. For example, as the user presses on the top shell, the area of the finger and thus the image of the finger grows due to the force being exerted thereon. The growing image can therefore be used to determine that a clicking action associated with a button event has been performed. Furthermore, this can be done regionally to initiate left and right button events as well as squeeze events as for example when the mouse is pinched at its sides. In fact, because the buttons are not fixed, the mouse buttons may be programmable based on the needs of each user. They may even be automatically adjustable based on how the mouse is being used or held.

In another embodiment, the signals generated by the imaging system are used for tracking events. For example, movements of the finger about the top surface may initiate similar movements of an input pointer on a display of the host device.

In another embodiment, the signals generated by the imaging system are used for changing the mode of the mouse. For example, placement or lack of a finger(s) in one area of the top surface may initiate a first mode, and placement or lack of a finger(s) in a second area of the top surface may initiate a second mode.

In another embodiment, the signals generated by the imaging system are used for gesturing events. For example, the user may be able to perform different hand gestures on the top shell with each gesture meaning a different action in the host device. The gestures may be performed with one or more fingers, and may include translating, rotating, pressing, tapping and the like. The actions may be widely varied and may include for example zooming, paging, scrolling, rotating, enlarging/shrinking, etc. By way of example, rotating a finger in a circular manner may initiate rotation of a displayed object in the host device or moving a highlight bar through a list of media items, or moving fingers together and away from one another may initiate zooming or enlarging/shrinking of a displayed object in the host device. Moreover, sliding a finger up and down may initiate vertical scrolling, and sliding a finger side to side may initiate horizontal scrolling.

In another embodiment, the signals generated by the imaging system are used for determining the identity of the user. For example whether the user is Frank or Lisa or whether the user is left or right handed. This may be accomplished by analyzing the orientation and size of the fingers or alternatively using some sort of fingerprint transform. Once the identity is determined, the inputs can be processed according to preprogrammed instructions.

Furthermore, the signal interpretation may be implemented at the mouse and/or the host device to which the mouse is connected. That is, the mouse and the host can act separately or together to generate commands to be used by the host device. In case of the mouse, the signal interpretation may be implemented via the controller/firmware. In case of the host device, the signal interpretation may be implemented via processor/software.

Moreover, the signal interpretation may be programmable so as to allow a user to control the type and number of functions implemented by the mouse. This allows the inputting to be slightly customized so as to better match the desires of the user. For example, a right handed user may want to configure the mouse differently than a left handed user. In addition, once a user increases their skills, they may want to add more functionality to the mouse. In some cases, a control panel may be used to allow a user to program the functionality of the mouse. For example, the control panel may include enable/disable selections, or specific configurations to choose from such as a one button or two button mouse with or without gesture recognition.

These and other embodiments of the invention are discussed below with reference to FIGS. 1-17. However, those skilled in the art will readily appreciate that the detailed description given herein with respect to these figures is for explanatory purposes as the invention extends beyond these limited embodiments.

FIG. 1 is a perspective view of a configurable mouse 10, in accordance with one embodiment of the present invention. The configurable mouse 10 is a movable handheld input device for providing user commands to a host system such as a personal computer. The configurable mouse 10 is configured with limited or no fixed mechanical input devices such as buttons and scroll wheels. Instead, the configurable mouse 10 includes an extended sensing surface, which provides the mouse with a customizable, programmable, and/or adaptable way of generating inputs. That is, the inputting is no longer fixed or limited to a particular location, and instead can be performed anywhere on the mouse 10. As such, the mouse can be held in any manner by the user without loss of inputting controls.

The configurable mouse 10 includes a body 12 that encloses the internal components of the mouse 10. The body 12 includes at least an arbitrarily shaped grippable portion 14 for holding the mouse 10 and moving it across a surface. The grippable portion 14, which generally forms at least the front, side, back and top surfaces of the mouse 10 may for example be configured with a 3D shape that substantially conforms to a hand so that the mouse 10 can be easily manipulated by the hand. By way of example, the grippable portion 14 may be dome shaped or wedge shaped. In one embodiment, the grippable portion 14 is formed from a single member. That is, it is a unitary structure. In another embodiment, it generally includes a large undisturbed surface. For example, a large portion of the surface is undisturbed. In yet another embodiment, it forms a continuous surface with no breaks or lines or protrusions (e.g. no mechanical actuators such as mechanical buttons or mechanical scroll wheels). In the illustrated embodiment, the grippable portion 14 is formed from a single unitary member with a full continuous surface. This is better for creating a large sensing surface (e.g., not limited by structures disposed in its surface). Furthermore, due to lack of mechanical features (mechanical buttons) it does not wear out and therefore the mouse lasts longer. Moreover, the mouse is less affected by contaminants.

The configurable mouse 10 also includes a position detection mechanism 16 such as a track ball or optical assembly that detects or senses the movement of the mouse 10 along a surface. The data produced by the position detection mechanism 16 is typically used to direct an input pointer to move on a display screen in a direction similar to the direction of the mouse 10 as it is moved across a surface. For example, when the mouse 10 is moved forward or backwards, the input pointer is moved vertically up or down, respectively, on the display screen. In addition, when the mouse 10 is moved from side to side, the input pointer is moved from side to side on the display screen.

The mouse 10 further includes a multipoint touch detection mechanism 18 that detects or senses multiple objects that are touching (or proximate) the entire or substantially large portion of the grippable portion 14 such as when one or more fingers are placed on, tapping and/or moving across any portion of the grippable portion 14. The data produced by the touch detection mechanism 18 may be used for additional commands such as tracking commands, scrolling commands, button commands, mode commands, and other navigation commands such as paging, rotating, zooming, enlarging/shrinking, etc. The commands may be based on the touch data as well as programmed instructions located within the mouse and/or the host system.

The mouse 10 additionally include a controller 20 for processing the signals generated by the position detecting mechanism 16 and multipoint touch detection mechanism 18. The controller 20 is typically configured to turn these signals into data, which can be used by a host system. By way of example, the controller 20 may send position data associated with movements of the mouse 10 and touch data associated with one or more touches that occur on the grippable portion of the mouse to the host system. In some cases, the controller 20 may send this data separately as separate messages. In other cases, the controller may group the position and touch data together into a single message. In either case, the data may be used by the host system to perform simultaneously or separate actions based on its programming.

In accordance with one embodiment, various commands may be generated based on the touch data. This may be accomplished by analyzing the touch data to determine hand positions/hand motions and mapping various hand positions/hand motions to one or more specific computing operations. For example, hand motions may include tapping, sliding or pressing one or more fingers at the same or different times on the grippable portion 14 of the mouse 10.

A wide range of different hand motions can be utilized. By way of example, the hand position/motions may be single point or multipoint; static or dynamic; continuous or segmented; and/or the like. Single point are those positions/motions that are performed with a single contact point, e.g., the positions/motions is performed with a single touch as for example from a single finger, or a palm. Multipoint are those positions/motions that can be performed with multiple points, e.g., the positions/motions are performed with multiple touches as for example from multiple fingers, fingers and palms, or any combination thereof. Static are those positions/motions that do not include motion, and dynamic are those positions/motions that do include motion. Continuous are those positions/motions that are performed in a single stroke, and segmented are those positions/motions that are performed in a sequence of distinct steps or strokes.

A wide range of commands can be generated. By way of example, the commands may be associated with buttoning, tracking, moding, zooming, panning, scrolling, paging, rotating, sizing, and the like. As further examples, the commands may also be associated with launching a particular program, opening a file or document, viewing a menu, making a selection, executing instructions, logging onto the computer system, permitting authorized individuals access to restricted areas of the computer system, loading a user profile associated with a user's preferred arrangement of the computer desktop, and/or the like.

During an exemplary operation, the grippable portion 14 receives a hand thereon and the controller 20 working in conjunction with the touch detection mechanism 18 generates touch data based on the hand position/motion. Thereafter, the touch data is sent to a command generator. In some cases, the command generator is located in the host system. In other cases, the command generator is located at the mouse. After receiving the touch data, the command generator identifies one or more hand positions/motions from the touch data and generates a command based on the identified hand positions/motions. By way of example, the command generator may include a table of hand positions/motions and commands associated with each hand position/motion. Once the commands are generated, the commands are sent to one or more software agents, which decide what to do with the commands. By way of example, the software agents may be associated with an operating system, active program, and/or the like.

In accordance with one embodiment, the touch detection mechanism 18 is configured to optically image the entire or substantially large portion of the grippable portion 14. In this embodiment, the touch detection mechanism 18 generally includes a light arrangement 22 and an imaging arrangement 24 that work together to image the grippable portion 14 of the mouse 20. Both the image arrangement 24 and the light arrangement 22 communicate with the controller 20 that directs the light arrangement 22 to emit light into an optically transmissive grippable portion 14 and to capture images of the optically transmissive grippable portion 14 of the mouse 10 via the imaging arrangement 24 in a controlled manner. Generally speaking, the light arrangement 22 illuminates the grippable portion 14, and the imaging arrangement 24 acquires sequential surface images (e.g., multiple surface images per second) of the illuminated optically transmissive grippable portion of the mouse. These images may be used to determine the direction, position, speed, and acceleration of one or more objects (fingers, palm) proximate or touching the grippable portion 14 of the mouse 10. In the case of multi-point processing, this is done for multiple objects at the same time.

As should be appreciated, the single unitary member with a full continuous surface that is illustrated may be easier to image since it does not include any breaks, lines, etc in its grippable surface (e.g., no mechanical buttons).

Figure 2:
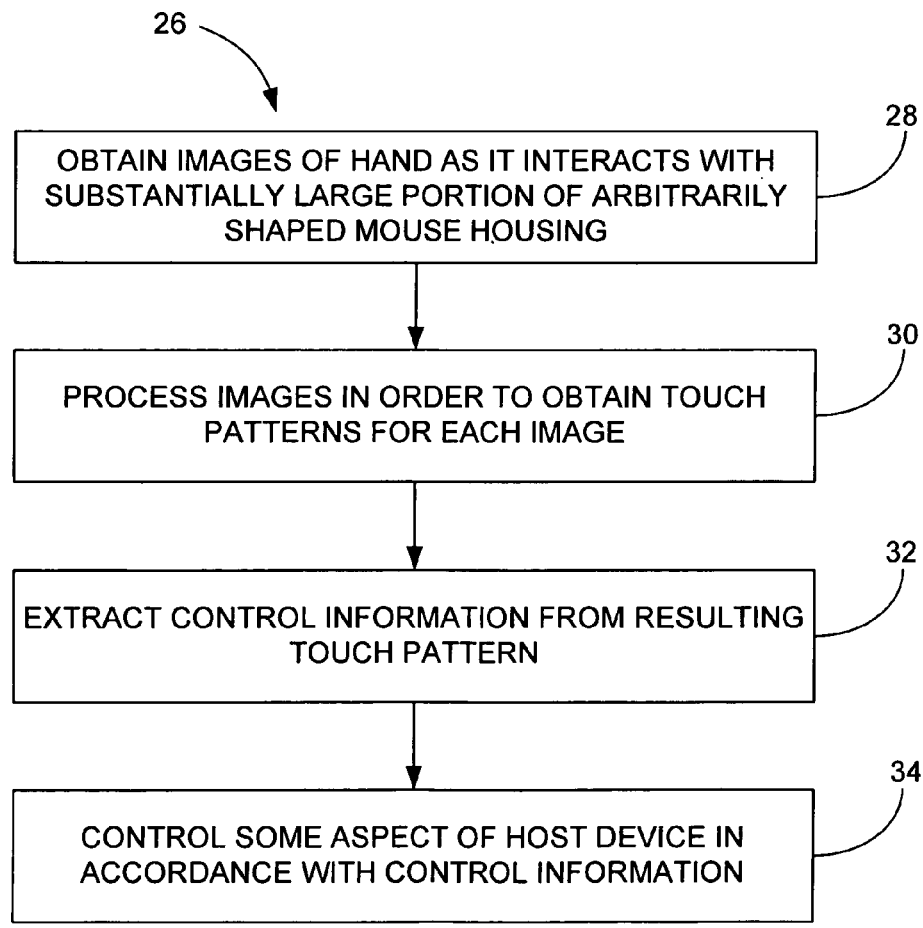
FIG. 2 is a method of operating a mouse, in accordance with one embodiment of the present invention.

FIG. 2 is a method 26 of operating a mouse, in accordance with one embodiment of the present invention. The mouse may for example correspond to the mouse described in FIG. 1. The method 26 begins at block 28 where images of a hand as it interacts with any portion of an arbitrarily shape mouse housing are obtained. This may for example be accomplished with a touch detection mechanism and further an optical imaging system that continuously or at regular intervals images fingers and the palm in contact with the mouse housing.

Thereafter, in block 30, the images are processed in order to obtain touch patterns for each image. This may for example be accomplished with a mouse controller such as a DSP. Alternatively or additionally, this may be accomplished by a host device such as a personal computer to which the mouse is operatively connected. The step of processing the image may include correcting the image and/or locating distinct elements within the image. By way of example, correcting the image may include converting a warped image (caused at least in part by imaging the arbitrarily shaped mouse housing) to an unwarped image. Furthermore, locating distinct elements may include differentiating image elements associated with a touch from image elements not associated with a touch. This may for example be performed by segmenting the image based on differences in color, light intensity, etc.

Thereafter, in block 32, control information is extracted from the resulting touch patterns. This is generally accomplished by the host device. Alternatively or additionally, this may be accomplished by the controller of the mouse. The control information may include such things as tracking commands, button commands, scroll commands, rotate commands, zoom commands, sizing commands, paging commands, etc.

Thereafter in block 34, the control information is used to control some aspect of the host device. The control information may for example be used to control a graphical user interface element and any programming linked thereto. To cite a few examples, if the control information includes a rotate command and an object such as a JPEG image is active, then the JPEG image rotates in accordance with the rotate command. In addition, if a list of media items is active and the control information includes a rotate command or a vertical scroll command, then a highlight bar may be made to linearly traverse through the list of media items in accordance with the rotate or scroll command. Furthermore, if a web page is active and the control information includes a scroll command, then the contents of the web page are scrolled through in accordance with the scroll command.

The active element may be determined a variety of ways. In one embodiment, the active element is the element underneath the cursor (which is controlled by mouse tracking). A user simply moves the cursor to the desired location, and thereafter any control information produced by a hands interaction with the mouse is directed to the element at that location. In another embodiment, the active element is a currently active program (one that is opened). In yet another embodiment, the active element may be a currently selected or highlighted element.

Figure 3:
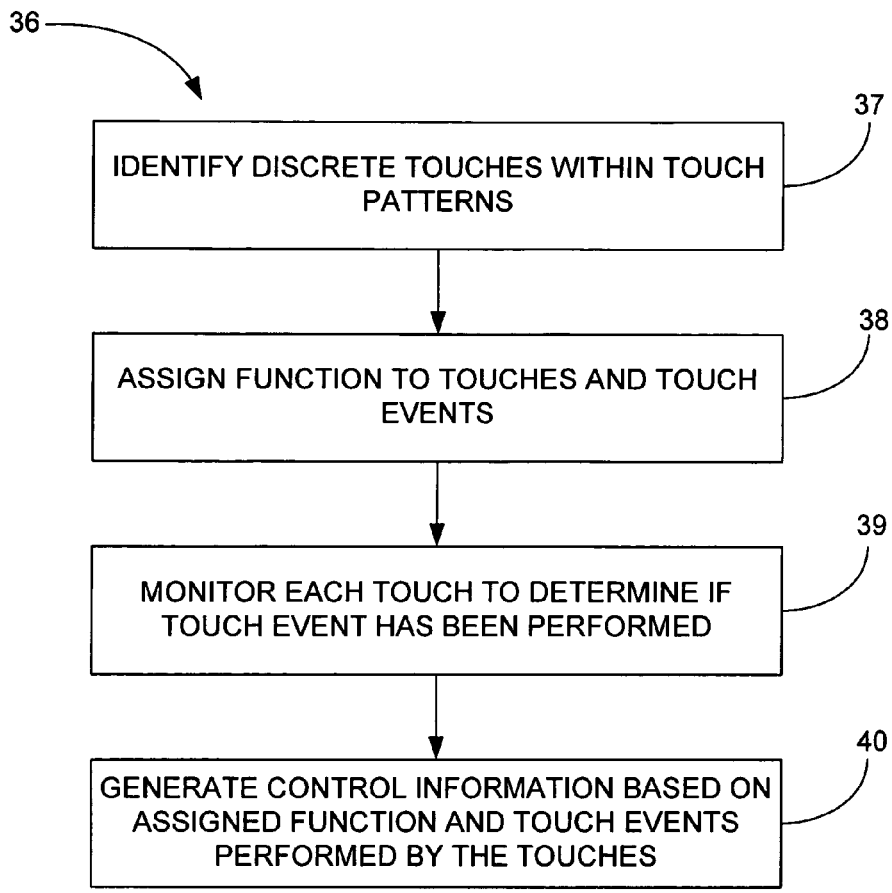
FIG. 3 is a method of extracting control information, in accordance with one embodiment of the present invention.
Figure 4:
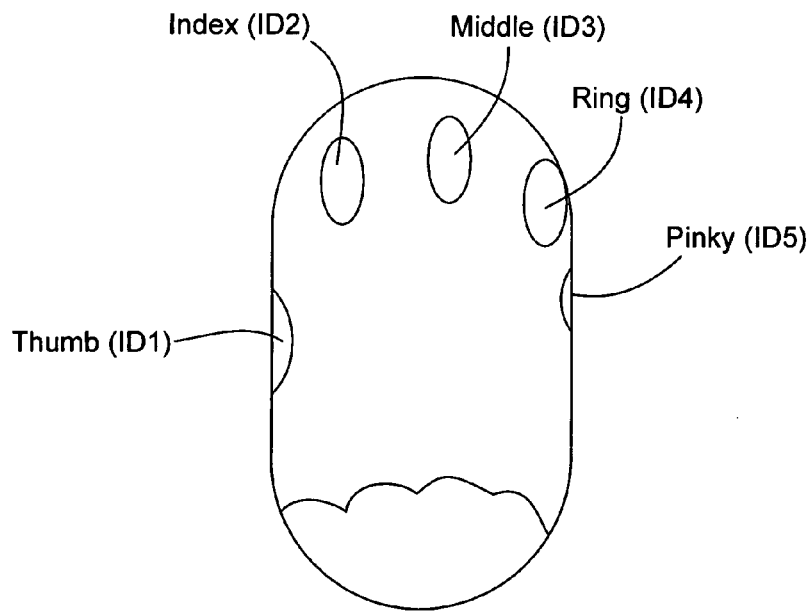
FIG. 4 is a touch pattern with identified touches, in accordance with one embodiment of the present invention.

FIG. 3 is a method 36 of extracting control information in accordance with one embodiment. The method 36 may for example correspond to block 32 of FIG. 2. The method 36 generally begins at block 37 where discrete touches are identified within the touch patterns. For example, as shown in FIG. 4, whether a discrete touch is a thumb, index finger, middle finger, ring finger, pinky finger, or palm. This may be determined by analyzing the size and location of the touches relative to their position on the mouse, relative to each other and/or relative to a test image.

In the case of relative to their position on the mouse (and for a right handed user), the thumb is typically located at the left side surface of the mouse, the pinky is typically located on the right side surface of the mouse, the index finger is typically located on the left top surface of the mouse, the middle finger is typically located on the right top surface of the mouse and the ring finger is typically located either on the right top surface or right side surface or somewhere in between. By locating touches relative to these regions, the various touches can be linked to the appropriate fingers.

In the case of relative to each other (and for a right handed user), the thumb is the outermost left side finger, which lies below the other fingers, and which is typically larger than any of the other fingers. Furthermore, the pinky is the outermost right side finger, which lies below the other fingers, and which is typically smaller than the other fingers. Moreover, the index finger is located on the left side next to the thumb, the ring finger on the right side next to the pinky, and the middle finger between the index finger and the ring finger. The middle finger typically extends above the index and ring fingers. Furthermore, the spread between fingers is fairly constant so this adds another element in identifying the digits. By locating touches and their characteristics relative to one another, the various touches can be linked to appropriate fingers.

In the case of relative to a test image, the user may go through a learning sequence in order to teach the mouse his/her desired or typically hand configuration. For example, the mouse may image the touches and then ask the user to identify the touches from the image. This may be repeated to reduce error (e.g., averaging). By locating touches relative to a known configuration, the various touches can be linked to the appropriate fingers Alternatively, instead of identifying, the touches may simply be designated as particular touches as for example touch 1, touch 2, touch 3 and so on.

In block 38, a function is assigned to the touches and touch events produced therefrom. The function may be assigned to an individual touch (e.g., index finger) or to a group of touches (e.g., index finger and middle finger). With regards to group, any combination of touches may be used as for example index/middle, thumb/ring, thumb/index/middle, etc. This may be accomplished by referring to a system configuration (e.g., O/S), a program configuration associated with an active program (e.g., word processing), a user configuration (e.g., control panel), a mouse configuration, and/or the like. Each of these configurations map particular touches and touch events to particular function. These may come as defaults settings that cant be changed or alternatively they may be programmable or learned. In the case of programmable, the user may go to a control panel where they can enable/disable functionality or reassign functionality to different touches/touch events.

In block 39, each touch is monitored to determine if a touch event has been performed. In the simplest case, whether one or more touches are stationary, in motion, pressing, touching or not touching. In a more complex case, whether one or more touches is tapping, pressing with greater or less intensity, translating forward/backward, translating side to side, rotating in a circular fashion (clockwise or counter clockwise), etc. The characteristics of the touch event can also be taken into account. For example, the acceleration of a translating or rotating finger or the intensity of a press.

Thereafter, in block 40 control information is generated based on the assigned function and the touch events performed by the touches. The control information may be used to control/modify an active window, objects within a window, etc.

Table 1 shows several examples of functions that can be assigned to particular touches and touch events.

TABLE 1

| Touch | Touch Event | Function |
| --- | --- | --- |
| Thumb | translating forward/backward | zoom in/out or enlarge/shrink |
| Thumb | translating side to side | rotate clockwise/counter clockwise |
| Index | pressing | left button (right handed user) |
| Middle | pressing | right button (right handed user) |
| Index | translating forward/backward | scroll up/down (vertical) |
| Index | translating side to side | scroll side to side (horizontal) |
| Index | rotating in circular fashion | rotate clockwise/counter clockwise |
| Middle/Index | pressing | left button (right handed user) |
| Middle/Index (paging) | translating forward/backward | scroll through multiple pages |
| Thumb/Ring | pressing (squeezing) | expose feature |
| Pinky | no pinky/pinky | mode 1/mode 2 |
| Only Index | translating (any direction) | tracking |
| Any finger | tapping | select or left button |

It should be appreciated that Table 1 is shown by way of example and not by way of limitation. It is conceivable that any function (even those not mentioned) can be mapped to any touch/touch event (even those not mentioned). For example, although scrolling was applied to the index finger in Table 1, it should be noted that this is not a limitations and that scrolling can be performed from any finger or any combination of fingers. For example, a translating thumb may be used for scrolling.

Figure 5:
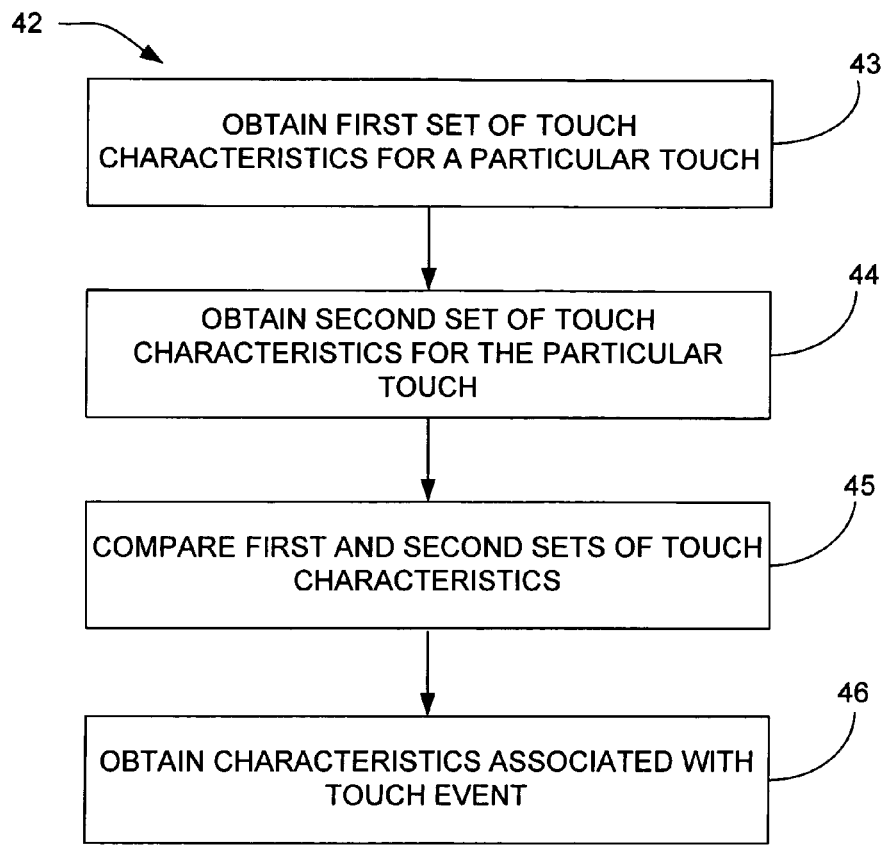
FIG. 5 is a method of monitoring each touch to determine if a touch event has been performed, in accordance with one embodiment of the present invention.

FIG. 5 is a method 42 of monitoring each touch to determine if a touch event has been performed, in accordance with one embodiment of the present invention. The touch event may for example including translating, rotating, tapping, pressing, etc. The method 60 may for example correspond to block 39 in FIG. 4. The method 42 generally begins at block 43 where a first set of touch characteristics are obtained for a particular touch (e.g., touch 1, touch 2, touch 3, etc.) Thereafter, in block 44, a second set of touch characteristics are obtained for the particular touch. The first touch characteristics may be extracted from an image in a sequence of images and the second touch characteristics can be extracted from the next image in the sequence of images. The image and next image may for example be the last image and the current image respectively. The characteristics may include position, angle, area, etc.

Thereafter, in block 45, first touch characteristics and the second touch characteristics are compared. If the difference is within a threshold value, then a touch event has not been performed. The threshold is designed as a filter or noise reduction feature. As should be appreciated, the user tends to readjust hand positions during use and this readjustment needs to be filtered from intended touch events for inputting. If the difference is outside a threshold value, then a touch event has been performed. The threshold value for determining whether a touch event has been performed may be embodied as a single threshold value (e.g., if lower then no touch event, if higher then touch event) or it may be embodied with a lower threshold and an upper threshold. A lower and upper threshold provides a hysteresis loop, which prevents annoying toggling.

If a touch event has not been performed, the method is repeated as long as the touch is still detected. If a touch event has been performed, the method proceeds to block 46 where characteristics associated with the touch event are obtained from the differences. For example, the characteristics may include direction, acceleration, and the like. The characteristics can be used to drive the functions associated with the touch event. For example, the direction can be used to determine if the finger is translating forward/backwards or side to side or rotating, and the acceleration of the finger may be used to drive the acceleration of the command. In most cases, consecutive sets of touch characteristics are repeatedly obtained during the touch event in order to continuously obtain characteristics associated with the touch event.

Figure 6:
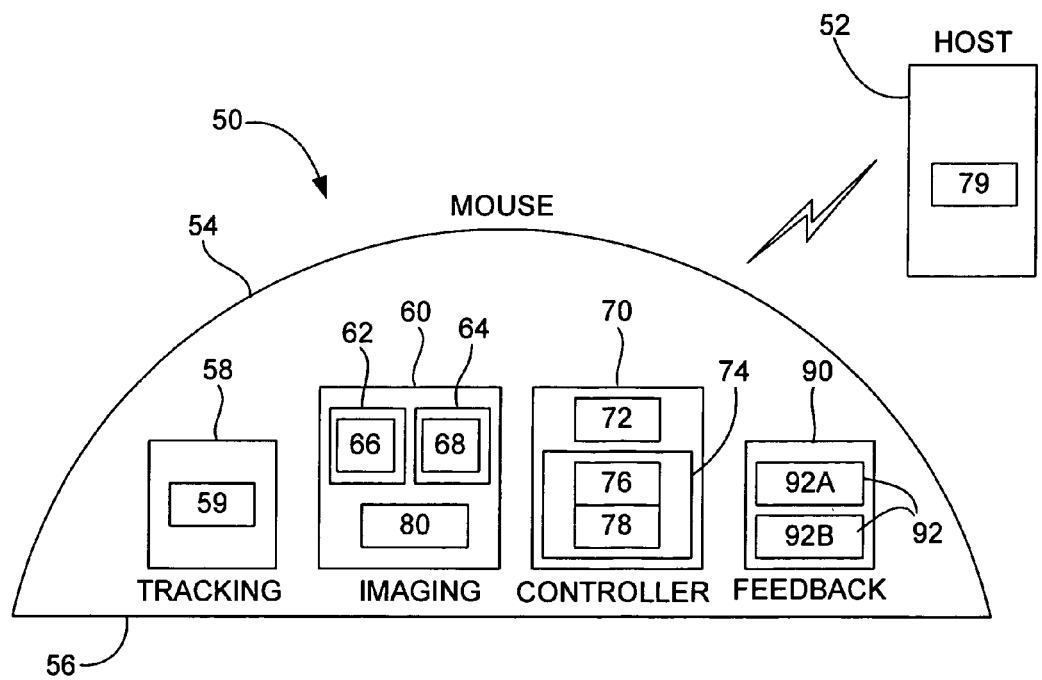
FIG. 6 is a simplified block diagram of a mouse, in accordance with one embodiment of the present invention.

FIG. 6 is a simplified block diagram of a mouse 50, in accordance with one embodiment of the present invention. The mouse may for example correspond to the mouse shown in FIG. 1. The mouse 50 is typically in communication with a host device 52 such as a personal computer in order to provide inputs to the host device 52.

The mouse 50 may be coupled to the host device 52 via a wired or wireless connection 51. In the case of wired connections, the mouse 50 may include a cable/connector of various protocols for connecting to the host device. By way of example, USB, Firewire, RS232, and the like may be used. In the case of wireless connections, the mouse may include a radio frequency (RF) link, optical infrared (IR) link, Bluetooth link or the like in order to eliminate the cable.

The mouse 50 includes a top shell 54 and a base 56 that is connected to the top shell 54. The top shell 54 and base 56 cooperate to form the housing of the mouse 50. That is, the top shell 54 works with the base 56 to define the shape or form of the mouse and fully enclose the mouse electronics of the mouse 50. The base 56 supports the top shell 54 as well as most of the mouse electronics thereon including for example a printed circuit board, computer chips, mouse tracking devices, switches, and other circuitry. The top shell 54, on the other hand, provides a structure for gripping the mouse 50 during use. In one embodiment, the top shell is formed from a single member, and further a single member with a large undisturbed continuous surface. In some cases, the undisturbed continuous surface forms the entire outer surface of the top shell (no breaks, lines and protrusions).

The base 56 and top shell 54 may be widely varied. In most cases, the base 56 is a substantially planar or flat member, which is capable of traveling across a flat surface such as a desk. The top shell 54, on the other hand, is typically a complex shaped component (defined by three dimensions X, Y, Z) that surrounds and covers the mouse electronics. The base generally forms the bottom surface of the mouse 50 while the top shell generally forms the top front, back and side surfaces of the mouse.

Because of this configuration, the contour of the top shell 54 typically embodies the outward physical appearance of the mouse 50. The contour of the top shell 54 may be rectilinear, curvilinear or both. The contour may further be symmetrical or asymmetrical (along its length, height and/or width). In the illustrated embodiment, the top shell is curvilinear and symmetrical. In particular, the top shell 54 substantially forms a hemisphere or half sphere (e.g., dome shaped).

It should be understood, however, that this is not a limitation and that the form and shape of the top shell 54 may vary according to the specific needs or design of each mouse. Generally speaking, the contour is such that it can easily and comfortably fit inside the users hand (e.g., ergonomic). By way of example, the top shell 54 may be formed in shapes such as a curved or rounded wedge. The Pro Mouse manufactured by Apple Computer, Inc. is one example of a mouse with a top shell having a curved or rounded wedge shape.

In addition to domes and wedges, the top shell 54 may further be based on other geometric shapes such as a box, cube, a cylinder, a pyramid, a cone, etc. as well as more advanced shapes such as a combination of the above or an object such as an apple, a house, a car or the like.

In one embodiment, the mouse 50 is a unibody mouse that integrates at least one button function directly into the top shell 54, i.e., pressing on the top shell creates a clicking action. As such, any part of the hand, from finger to thumb to palm, can trigger a clicking action. In this embodiment, the top shell 54 is configured to move relative to the base 56 so as to provide a clicking action that implements the button functionality of the mouse 50. The entire surface of the top shell above the base acts as a single or multiple button. The clicking action (e.g., the movement of the top shell relative to the base) may be provided through one or more degrees of freedom (DOF). The degrees of freedom may be implemented through one or more rotations, pivots, translations, flexes (and/or the like) relative to the base. By way of example, the top shell 54 may be coupled to the base 56 via one or more pin joints, slider joints, ball and socket joints, flexure joints and the like, and may include a spring means for biasing the top shell in an unclicked position. Examples of unibody mice can be found in U.S. patent application Ser. Nos. 10/209,537, 09/482,152, and 10/060,712 all of which are herein incorporated by reference.

The mouse 50 also includes a mouse tracking unit 58 for tracking movements of the mouse 50 along a surface. The mouse tracking unit 58 may for example include a track ball or optical sensor 59 that generates tracking signals when the mouse 50 is moved along a flat surface. The tracking signals may be used for example to move a cursor or pointer on a display screen of the host device 52. The mouse tracking unit 58 is typically supported by the base 56 and may be mounted on and operatively coupled to a printed circuit board housed with the top shell 54 and base 56. Trackballs and optical sensors are well known and well not be described in detail herein.

The mouse 50 additionally includes an optical imaging system 60 for imaging the top shell 54 including curved portions and flat portions alike. The images can be used to generate multipoint touch signals when the hand is positioned on or over the top shell 54. In one embodiment, the optical imaging system 60 images the entire top shell 54. In another embodiment, the optical imaging system 60 images a major or substantially large portion of the top shell 54. By large portion, it is generally meant that substantially 85% of the top shell 54 and more particularly 90% of the top shell 54 and even more particularly 95% of the top shell 54 is imaged. It should be appreciated, however that this is not a limitation and that a smaller portion may be imaged (e.g., less than 85%, less than 70% and maybe even about 50%). For example, only portions of the top shell that are typically touched during manipulation thereof may be imaged (e.g., top portion of mouse, front portion of mouse, etc.). Generally speaking, the greater the percentage, the more versatile the input features of the mouse.

As shown, the optical imaging system 60 includes an illumination source 62 for illuminating the top shell 54 and an imaging sensor arrangement 64 for imaging the top shell 54. Furthermore, the top shell 54 is formed from single or multiple layers of optically transmissive materials. For example, it can be formed from transparent (e.g., clear) and/or semi-transparent plastic materials (e.g., smoked, diffused, etc.). The transparency as well as the material used may depend on the type of illumination being used (e.g., visible, IR, etc.). Examples of plastics that can be used include polycarbonate and/or acrylic. It should be understood however that this is not a limitation and that other materials may be used.

During an imaging operation, the illumination source 62 illuminates the optically transmissive top shell 54, and the imaging sensor arrangement 64 images the top shell 54 when the top shell 54 is illuminated. If an object is placed on or near the outer surface of the top shell 54, the object causes the light in the region of the object to be reflected back inside the mouse 50. The image sensing system 64 captures the image of the object via the reflected light (takes a picture of the top shell). For example, the area of the object in contact with the top shell 54 shows up as light areas on the sensor arrangement 64 and the remaining areas show up as dark areas on the sensor arrangement 64. This can include gradients of light and dark (i.e., the edge of the object is generally darker than the central potion of the object, but lighter than the areas surrounding the object). The amount of lightness and darkness at each node of the sensing arrangement 64 generally depends on the amount of light being reflected back at the sensor arrangement 64 in the location of the sensing nodes of the sensor arrangement 64.

In one embodiment, the illumination is constantly provided, and the image sensor arrangement 64 continuously images the surface (video). In another embodiment, the illumination is provided incrementally and the image sensor arrangement 64 only images when the illumination is incrementally provided (snap shots). For example, the illumination is continuously turned on and off in order to illuminate the top shell 54 and while the illumination is turned on, the image sensing arrangement 64 images the top shell 54 (e.g., takes a picture).

One advantage of constantly illuminating the mouse 50 is that the mouse 50 can be configured with a characteristic glow that alters the ornamental appearance of the mouse 50. In fact using an illumination source that provides multiple colors of light, the coloration of the mouse 50 can be changed in accordance with a users needs or as an alert or indicator. For example, the mouse may change from red to blue to indicate a system event but without interfering with imaging. Examples of colorizing housings with light can be found in U.S. patent application Ser. Nos. 10/075,964, 10/075,520 and 10/773,897, which are all herein incorporated by reference.

The illumination source 62 may include one or more light sources 66 that are strategically placed inside the mouse 50. The number of light sources 66 and location within the mouse 50 is generally dependent on the amount of illumination and coverage provided by each light source 66. The illumination provided by all the light sources 66 generally needs to cover the portion of the top shell 54 desired to be imaged. As should be appreciated, it is not a non-trivial task to illuminate the entire or substantially large portion of the top shell 54 and therefore careful selection and placement of the light sources 66 is required.

Generally speaking, any number of light sources 66 at any location within the mouse 50 may be used. In one embodiment, the light generated by the light sources 66 is made incident on the inner surface of the top shell 54. That is, the light sources 66 shine light or direct light at the inner surface of the top shell 54. In another embodiment, the light generated by the light sources 66 is made incident at an edge portion of the top shell 54. That is, the light sources 66 shine light or direct light at the edge of the top shell 54. In yet another embodiment, the light generated by the light sources 66 is made incident on the inner surface of the top shell 54 and at an edge portion of the top shell 54. In all of these embodiments, the entire or substantially large portion of the top shell 54 is illuminated. Each of these embodiments will be described in greater detail below.

The light sources may be widely varied. In one embodiment, the light sources are light emitting diodes (LEDs). LED's offer many advantages. For example, LED's are relatively small devices that are energy efficient and long lasting. LED's also run relatively cool and are low in cost. Alternatively, a single or multiple (rgb) or invisible (infrared, UV) laser diode(s) may be used instead or (or in addition to) the LEDs (in combination with a suitable diffuser).

In order to help imaging, it is generally preferred to provide uniform light at the top shell 54. This can be accomplished in a variety of ways. In one embodiment, the light is balanced by strategic placement of light sources 66. For example, they can be placed at locations that minimize low and high spots. In another embodiment, a light diffuser may be used to normalize the intensity. The light diffuser may be a surface treatment on the inner or outer surface of the top shell 54, it may be embedded in the top shell 54, or alternatively it may be a separate member that is disposed between the top shell 54 and the light sources 66. For example, a light diffuser may be placed over each of the light sources 66.

The imaging sensor system 64 may include one or more image sensors 68 that are strategically placed inside the mouse 50. The number of image sensors 68 and location within the mouse 50 is generally dependent on the coverage provided by each image sensor 68 and the shape of the top shell 54. As should be appreciated, it is not a non-trivial task to image the entire or substantially large portion of the top shell 54 and therefore careful selection and placement of the image sensors 68 is required.

In one embodiment, a single image sensor 68 is used. A single sensor 68 may be used when trying to reduce the cost and complexity of the mouse or when space is limited inside the mouse. In another embodiment, multiple image sensors 68 are used. Multiple sensors 68 may be needed when the top shell 54 includes very complex shapes with steps, corners, edges, breaks or other complex features in the top shell 54.

The image sensor(s) 68 may for example correspond to a CCD or CMOS sensor chips. Each has advantages and disadvantages that must be taken into account when designing the mouse. In one particular implementation, a single CMOS sensor is used because it is low in cost. Furthermore, the CMOS sensor may be a VGA CMOS sensor for high speed imaging.

Different arrangements of lights and sensors may be used. In one embodiment, a single sensor and a single light system is used. In another embodiment, a single sensor and multiple light systems firing at different times is used. This may be done to acquire stereoscopic images. In another embodiment, multiple sensors and a single light source is used. Noise rejection from ambient light may be accomplished by means of synchronous detection, i.e., varying the light and intensity of illumination source and correlating the resulting image data. Generally speaking, synchronous detection is accomplished by pulsing the light source the frequency at which images are acquired, thus rejecting any out of band noise sources and enabling the in band light to pass. The pass band is referred to as the narrow band of frequencies that are centered around the image acquisition frequency. Only frequencies that are within the pass band (in band) are detected, frequencies outside the pas band are rejected. By way of example, ambient light (either from incandescent lamps, neon lamps (60 Hz flicker) are possible noise sources. In yet another embodiment, multiple sensors and multiple light systems firing at different times is used.

With regards to synchronous detection mentioned above, in some cases, ambient light may still enter the pass band. Therefore to improve noise rejection event further, it may be beneficial to vary the image acquisition frequency in random number fashion effectively dithering the passband across multiple frequencies and thus averaging any broadband light noise sources that may be present.

Stereoscopic imaging is useful to improve noise rejection event further by creating a spatially modulated light source. This means that the mouse surface is illuminated from two different angles, a separate image is taken for each illumination angle thus adding depth to the imaged top surface and providing more definition of the object to be imaged. The image sensor would be operated at the image acquisition frequency facq and the two illumination sources would be pulsed at facq/2 but phase shifted by 180 degrees. Using this scenario, the stereoscopic image is used to reduce noise injection.

The mouse 50 also includes a controller 70 that is operatively coupled to the mouse tracking unit 58 and the optical imaging system 60. The controller 70 may for example correspond to one or more digital signal processors (DSP). The controller 70 may include a mouse tracking module 72 associated with the mouse tracking unit 58 and a optical sensing module 74 associated with the optical sensing unit 60. Alternatively, separate controllers 70 may be used.

Using the modules, the controller 70 controls the operations of mouse tracking unit 58 and optical sensing unit 60 including illumination and imaging sequences. For example, the controller 70 tells each of these devices when illumination should be provided and when the sensors 68 should perform imaging (e.g., turning the light sources 66 on and off). The controller 70 may also analyze and process the raw data (images) produced therefrom in order to place them in a form that is recognizable to the host device 52 (e.g., USB HID).

In one embodiment, the controller 70 may convert the images produced from the optical sensing unit 60 to touch data and send the touch data to the host device 52. In another embodiment, the controller 70 may extract input commands such as button commands, scroll commands, mode commands, tracking commands, gesture commands and other relevant control information from the touch data and send the commands to the host device 52 (e.g., converts touch data into control commands). In either case, the host device 52 upon receiving the data interprets the data in accordance with its programming. Alternatively, the controller 70 may be configured to send the raw data to the host device 52. For example, the controller 70 sends the raw data to the host device 52 and then the host device 52 converts the images to touch data and thereafter the touch data to input commands.

In one embodiment, the host device 52 includes a mouse program 79 for controlling information from the mouse 50.

The mouse program may contain tables for interpreting the signals generated in the mouse 50. In one implementation, the tables may be accessed by a user through a control menu that serve as a control panel for reviewing and/or customizing the operation of the mouse 50, i.e., the user may quickly and conveniently review the settings and make changes thereto. Once changed, the modified settings will be automatically saved and thereby employed to handle future mouse processing. By way of example, the user may set the meaning of each touch/touch event. One advantage of being able to select the mouse functionality is that one mouse can be used by multiple users with different preferences, i.e., user configurable. Alternatively or additionally, a mouse program or some variation thereof may be stored in the mouse itself.

In some cases, especially those cases where an image sensor that includes a flat sensing surface whose field of view is less than 180 degrees and/or a sensing surface that is very close to the surface to be imaged is used, the optical imaging system 60 may further include a wide angled lens system 80 that increases the field of view beyond what is provided by the image sensor 68 thereby allowing the entire or substantially large portion of the top shell 54 to be imaged by the image sensor 68. During operation, the wide angled lens system 80 collects the light reflected back inside the top shell 54 at any point of the top shell 54 and redirects the light onto the image sensor(s) 68.

The lens system 80 may be a single lens or a group of stationary lenses to achieve the desired effect. It may further be a single or group of movable lenses although this typically not done for complexity reasons. The lens typically has two surfaces, which can be widely varied to achieve the desired effect. For example, the lens or lenses may be selected from concave/flat, convex/flat, convex/convex, concave/concave, concave/convex, convex/concave. The lenses may also have other complex shapes including symmetrical and asymmetrical shapes that depend on the shape of the top shell 54 (e.g., specially formulated for the shape of the top shell).

Unfortunately, the arrangement described above can produce images with distorted pixels. For example, the pixels may be expanded or stretched to a greater or lesser extent relative to other pixels. This may be referred to as warping. Therefore, in accordance with one embodiment, the controller 70 and further the optical imaging module 74 of the controller 70 may include a reverse warping transform 76 configured to map the distorted image to linear space (map image from curved space to flat space). That is, to convert the warped image to an unwarped image.

Alternatively or additionally, the de-warping may be performed by the lens assembly. One advantage of using a de-warping lens assembly is that you do not lose any resolution of the de-warped image, i.e., there is a one to one correspondence between the area of the top surface and the sensor area. If the warped image enters the image sensor the images of the denser pixel distribution may translate into lower resolution and conversely, images of stretched pixel distribution may translate into higher resolution images. For example, a first surface region of 1 mm$^2$ may translate to a sensor region comprised of 10 pixels, and a second region on a different part of the mouse surface may translate into a sensor region comprised of just one pixel depending on the amount of warping. This can cause reduction in resolution in this area. If the de-warping is performed in the lens assembly, there is a one to one correspondence between the surface area and sensor area, i.e., 1 mm$^2$ is going to map to 10 pixels across the surface.

Furthermore, in order to differentiate multiple points of contact within an image as for example when two or more fingers are contacting the top shell 54, the controller 70 and further the optical imaging module 74 of the controller 70 may further include a segmentation transform 78 capable of segmenting an image into discrete points. This allows multipoint touch sensing. An example of multipoint touch sensing can be found in U.S. patent application Ser. Nos. 10/654,108 and 10/840,862, both of which are herein incorporated by reference.

Because the touch sensing top shell 54 may not provide any feedback when activated (e.g., no mechanical detents), the mouse 50 may further include a feedback system 90 configured to provide feedback to the user of the mouse 50 so that the user is able to positively confirm that his action has resulted in an input. The feedback system 90, which is operatively coupled to the controller 70, includes one or more feedback generators 92 including audio feedback devices 92A and haptics devices 92B. Each of the feedback generators 92 provides a different kind of feedback to the user when an input is made. Audio devices 92A provide sound and haptics devices 92B provide forces. There may be a single feedback generator or multiple feedback generators that are used by all the inputs, or alternatively, there may be a feedback generator or multiple feedback generators for each input. That is, each input may include its own dedicated feedback generators.

In the case of audio feedback generators 92A, the mouse 50 may include on-board speakers or buzzers such as a piezo electric speaker or a piezo electric buzzer. These devices are configured to output a clicking noise when a user performs an action as for example when a user touches and/or performs a touch event on the top shell. This feature enhances the user's experience and makes each of the inputs feel more like mechanical input devices. The speaker may be configured to output the same clicking sound for each input, or alternatively the speaker may be configured to output different sounds for each input. For example, clicks, clocks, beeps and/or other synthesized sounds (music, etc) may be used. The different sounds may be user selectable.

During operation, the controller 70 sends driving signals to the speaker 92A when an input is made, and the speaker outputs one or more sounds in response to the driving signals. In some cases, the feedback may be tied to the touch characteristics as for example the level of force being applied to the touch sensing device or the speed of finger motion. For example, the clicking sound may be provided when a certain force threshold is reached, or the volume or pitch of the clicking sound may vary according to the level of force. Furthermore, in the case of finger motion, the rate of clicking sounds may increase as the rate of motion increases, and decreases as the rate of motion decreases or slows down. Hence, the clicking sounds provide audio feedback to the user as to the rate at which the input is made.

Additionally or alternatively, the mouse may include a haptics mechanism 92B. Haptics is the science of applying tactile sensation and control to soft devices that do not include any tactile feel. Haptics essentially allows a user to feel information, i.e., controlled vibrations are sent through the top shell of the mouse in response to a user action. The haptics mechanism 92B may include motors, vibrators, electromagnets, all of which are capable of providing force feedback in the form of controlled vibration or shaking. In the instant case, the haptics mechanism may be used to enhance the feel of making an input. By way of example, the haptics mechanism may be configured to generate impulsed vibrations when a user touches and/or performs some touch event on the top shell. This particular feature enhances the user experience and makes inputting feel more like mechanical devices. The haptics mechanism may be configured to output the same vibration for each input, or alternatively the haptics mechanism may be configured to output different vibration for each input. The different vibrations may be user selectable.

The haptics mechanism 92B may be centrally located or regionally located across the mouse. If regionally located, the mouse may include a haptics mechanism at each of the touch areas so as to provide force feedback in the area of the user action. It is generally believed that the closer the vibration is to the user action, the greater the haptics effect.

During operation, the controller 70 sends driving signals to the haptics mechanism 92B when an input is made, and the haptic device 92B outputs a vibration in response to the driving signals. In some cases, the vibration may be tied to the touch characteristics as for example the level of force being applied to the touch sensing device or the speed of finger motion. For example, a certain vibration may be provided when a certain force threshold is reached, or the intensity of the vibration may vary according to the level of force. Furthermore, in the case of finger motion, the rate of vibration may increase as the rate of motion increases, and decreases as the rate of motion decreases or slows down. Hence, the vibration provides force feedback to the user at the rate at which the input is made.

Each of the feedback generators 92 may be used solely or in combination with one other. For example, when used together, the speaker may provide audio feedback in the form of a click and the haptics mechanism may provide force feedback in the form of vibration. Again, the feedback may be provided at some central location or regionally across the top shell.

In some cases, the audio and haptic feedback may be provided by the same device. For example, a tactile click generator may be used. The tactile click generator generally includes a solenoid that causes a plunger to tap a rib inside the mouse housing. The tap provides both a tactile feel in the form of vibration and a tapping sound that is similar to a click.

Although the feedback systems have been primarily described as devices that provide feedback in response to inputting, it should be noted that they also may provide feedback in response to something that happens in the host system. For example, during a scrolling event, the host system may send a sound command to the mouse when the user has reached a boundary such as a top or border of the content being viewed on the display screen. The microcontroller sends a driving signal to the speaker in response to the sound command, and the speaker generates a sound in response to the driving signal. The sound informs the user that they reached the border.

It should also be pointed out that the feedback may be provided by the host system 52 rather than the mouse 50. For example, the host system may include a speaker that provides a click when the mouse buttons are utilized or a display that can visually alert a user when the mouse buttons are being utilized.

In one embodiment, the top shell 54 and base 56 are interconnected by means of a haptics mechanism 92B. In this embodiment, the mechanism provides mechanical force feedback by creating rotational and/or translation displacement between the base 56 and the top shell 54. The haptics mechanism 92B may generate the force feedback in response to mouse inputting so that the user knows when an input has been made. Different feedback can be provided for different inputs. That is, the haptic mechanism responds according to the type of finger movement. For example, when the index finger performs a circular motion on the top shell, the haptics mechanism may respond with a vibrating counter rotation. In essence, the type of haptic feedback (rotational, translational, pulsed, etc or a combination of those) is dependent on the kind of input (rotational, translational, pulsed etc.). Each input may potentially correlate to a different type of haptic feedback and the magnitude of the feedback may be dependent on the amount of force applied to a certain gesture (e.g., press harder, get more feedback).

Figure 7:
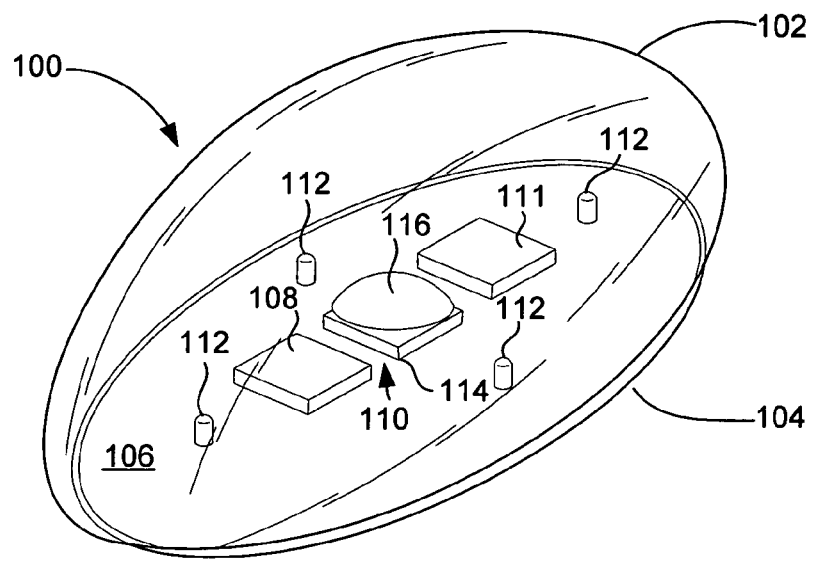
FIG. 7 is a perspective diagram of a unibody mouse, in accordance with one embodiment of the present invention.

FIG. 7 is a perspective diagram of a unibody mouse 100, in accordance with one embodiment of the present invention. The unibody mouse 100 may for example correspond to the mice described in FIGS. 1 and 4. The unibody mouse 100 includes a transparent arbitrarily shaped top shell 102 that is movably coupled to a flat planar base 104 in order to perform a clicking action. Because it is a unibody design, the entire top shell 102 acts as a button. The top shell 102 is further embodied as a continuous surface with no breaks, lines or openings (due for example from the elimination of mechanical buttons and scroll wheels).

Although various configurations can be used, in the illustrated embodiment, the unibody mouse 100 includes a top shell 102 that pivots relative to the base 104 between a clicked and unclicked position. This may for example be accomplished with a pivot located towards the back of the mouse thereby allowing the top shell 102 to tilt forward when a force is applied to the top shell 102. By way of example, the pivot may include a pivot support on each side of the base and a pivot pin on each side of the top shell 102. Furthermore, the top shell 102 has a round wedge like shape that tapers in a curved fashion from the back to the front of the mouse, and that includes rounded sides that form a somewhat oval cross section.

As shown through the top shell 102, the mouse electronics are positioned on a printed circuit board 106 that is connected to the base 104. The printed circuit board 106 may for example be snapped into the base 104. The mouse electronics include components such as a tracking device 108 for tracking movements of the mouse 100, an optical imaging system 110 for imaging the entire or substantially large portion of the top shell 102, and a digital signal processor 111 for controlling operations of the tracking device 108 and optical imaging system 110 and sending signals to a host device in accordance with the signals generated by the tracking device 108 and optical imaging system 110.

The optical sensing system 110, in particular, includes a plurality of light emitting diodes 112 for illuminating the transparent top shell 102, a single image sensor 114 such as a CMOS image sensor for imaging the transparent top shell 102, and a single wide angle lens 116 for expanding the FOV of the image sensor 114 so that the entire or substantially large portion of the transparent top shell 102 can be imaged by the image sensor 114.

The light emitting diodes 112 are dispersed about the top surface of the PCB 106 so as to provide illumination to the entire or a substantially large portion of the top shell 102 (e.g., area to be imaged). The image sensor 114 is disposed on the top surface of the PCB 106 and can be placed at various locations inside the mouse 100 (e.g., front, middle, back). In most cases, the image sensor 114 is placed at a location that makes imaging the top shell 102 easier. In most cases, this is a position that is central to the area desired to be imaged as for example in the centroid of the top shell 102 (as shown). The lens 116, which is a carefully ground or molded piece of transparent material (e.g., glass or plastic), is disposed above the image sensor 114 and can be attached to the image sensor 114 and/or the PCB 106. As should be appreciated, most image sensors have a field of view less than 180 degrees and because of stack up the sensing surface of the image sensor 114 is typically positioned higher than the lowest portions of the top shell 102 thus making it very difficult to image the top shell 102 without a wide angle lens 116. The wide angle lens 116 helps capture the lower points of the top shell 102 that are out of reach of the image sensor 114. In the illustrated embodiment, a convex/flat lens is used.

Figure 8A:
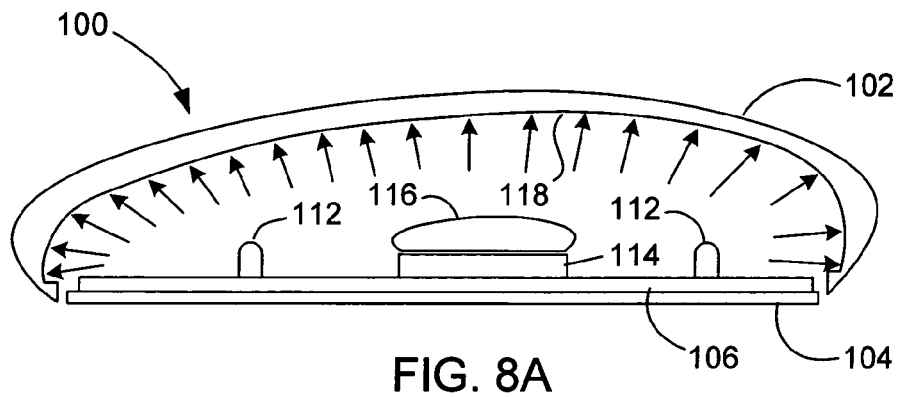
FIG. 8A is a side elevation view of a unibody mouse, in accordance with one embodiment of the present invention.
Figure 8B:
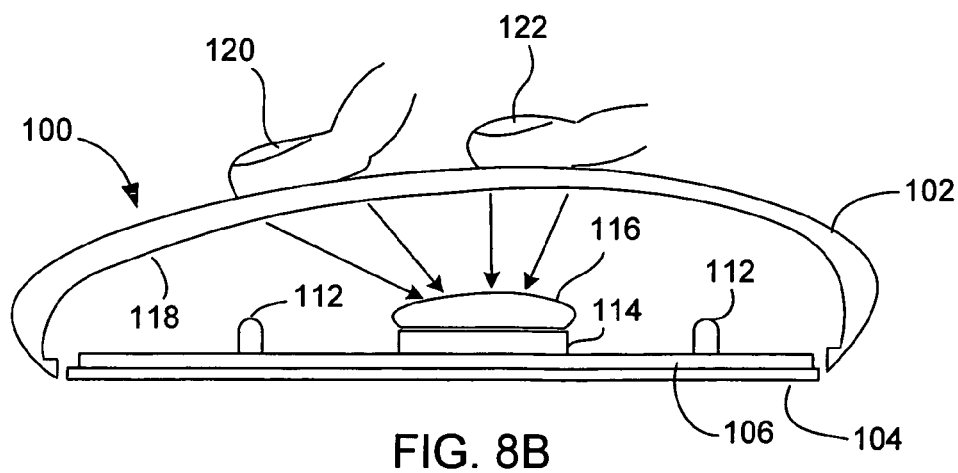
FIG. 8B is a side elevation view of a unibody mouse, in accordance with one embodiment of the present invention.

During an imaging operation, as shown in FIG. 8A, the LEDs 112 emit light in the direction of the top shell 102 such that the light is made incident on the inner surface 118 of the top shell 102. Because the top shell 102 is transparent, the light enters and passes through the top shell 102. As shown in FIG. 8B, when an object 120 such as a finger is placed on or near the top shell 102, light is reflected back inside the mouse 100. The lens 116 collects the beams of light bouncing off the object 120, and redirects them so they come together to form an image on the image sensor 114. In the simplest case, as light enters the lens at an angle, it bends in one direction as it travels through the lens, and then it bends again when it exits the lens. The light may even bend within the lens itself. The lens is designed in such a way as to collect and redirect the reflected light in a pixilated manner onto the sensing surface of the image sensor 114.

Furthermore, when multiple objects 120 and 122 are placed on the top shell 102, the lens collects beams of light bouncing off both objects and redirects them so they come together to form two distinct images on the image sensor 114. The same can be said for three, four objects and so on.

In some cases, the mouse 100 may further include a light diffuser. The light diffuser is configured to diffuse the light being emitted by the LEDs 112. This may be done to normalize the light intensity of the light at the top shell 102. This may also produce a characteristic glow at the top shell 102, and/or to hide the mouse electronics located inside the top shell 102.

Although the light diffuser can include color components, in most cases, the light diffuser appears as a white or semi transparent white material. When embodied with white elements, the light diffuser takes on the color of light emitted by the LEDs 112. Generally speaking, the light diffuser is positioned somewhere between the LEDs 112 and the outer surface of the top shell. More particularly, the light diffuser can be placed above, within or underneath the top shell 102. For example, a light diffuser can be placed on the upper surface, lower surface, or inside the top shell 102. Alternatively or additionally, the light diffuser may be integrated with or attached to the LEDs 112 or even be a separate component disposed between the LEDs 112 and top shell 102.

The light diffuser may be embodied in many different forms including for example surface treatments on one or more layers of the top shell 102, additives in one or more layers of the top shell 102, an additional layer in or on the surfaces of the top shell 102, etc.

In one embodiment, the light diffusing element is an additive disposed inside the top shell 102. For example, the top shell 102 may include a plurality of light scattering particles dispersed between the top and bottom surfaces of the top shell 102. When the light is made incident on the inner surface 118, it is transmitted through the top shell 102 until is intersects a light scattering particle 130 disposed inside the shell 102. After intersecting the light scattering particle 130, the light is scattered outwards in a plurality of directions, i.e., the light is reflected off the surface and/or refracted through the light scattering particl thereby normalizing the light intensity and creating a characteristic glow. By way of example, the light scattering particles may be formed from small glass particles or white pigments. Furthermore, by changing the amount of light scattering particles disposed in the top shell, the illumination characteristics can be altered, i.e., the greater the particles the greater the light scattering.

In another embodiment, the light diffusing element is a layer, coating and/or texture that is applied to the inner, side or outer surfaces of the top shell 102. For example, the top shell 102 may include a light scattering coating 132 or a light scattering texture 132 disposed on the side or outer surface of the top shell. By way of example, the light scattering coating may be a paint, film or spray coating. In addition, the light scattering texture may be a molded surface of the wall or a sandblasted surface of the top shell 102. When light is made incident on the inner or outer surface, it intersects the light scattering coating or texture applied on the surface of the top shell 102. After intersecting the light scattering coating or the light scattering texture 132, the light is scattered outwards in a plurality of directions, i.e., the light is reflected off the surface and/or refracted through the coating or texture 132 thereby normalizing the intensity and creating a characteristic glow.

Figure 9A:
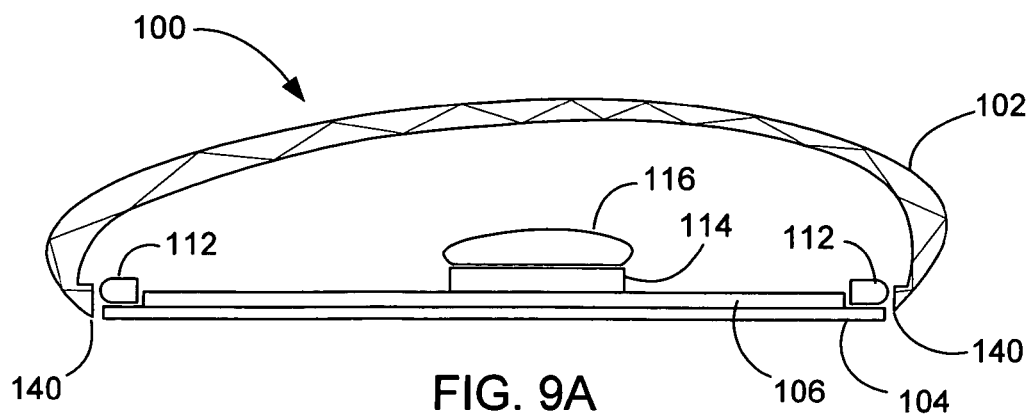
FIG. 9A is a side elevation view of a unibody mouse, in accordance with one embodiment of the present invention.
Figure 9B:
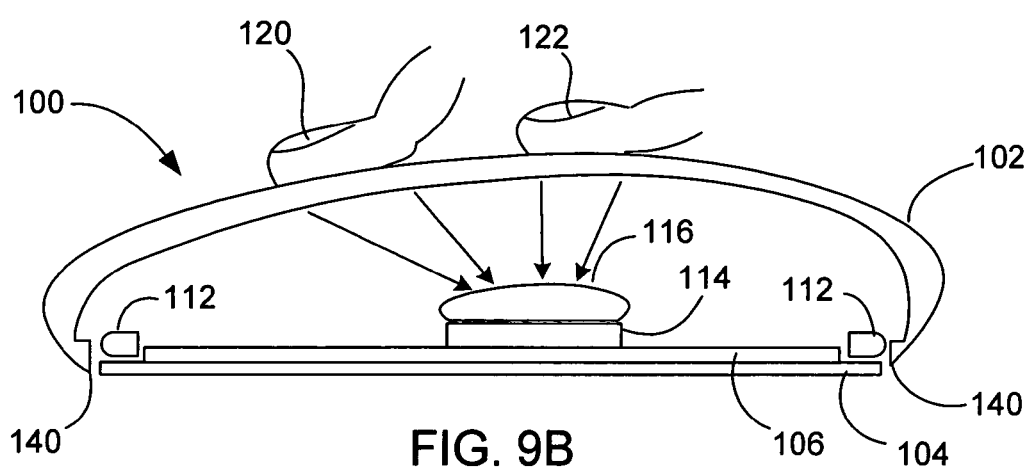
FIG. 9B is a side elevation view of a unibody mouse, in accordance with one embodiment of the present invention.

In an alternate embodiment, instead of illuminating the inner surface 118 of the optically transmissive top shell 102, the edge of the optically transmissive top shell 102 is illuminated. As shown in FIG. 9A, the light emitted by the LEDs 112 is made incident on an inner edge 140 of the top shell 102. The light is then directed through the top shell 102 (length wise rather than width wise). In essence, the top shell 102 acts like a light pipe that is configured for transferring or transporting light therethrough. Using total internal reflection, the light gets trapped inside the top shell and therefore bounces back and forth inside the top shell 102. Although the light is contained within the top shell 102, the top shell 102 typically looks clear with no indication that the light is present inside the top shell. As shown in FIG. 9B, when objects 120 and/or 122 are placed on or near the top shell 102, light traveling inside the top shell 102 is made to scatter and therefore it is reflected back inside the mouse 100. Generally speaking, placing your finger down gives light the ability to exit the top shell 102 (e.g., frustrated total internal reflection). The lens 116 collects the beams of light bouncing off the object 120, and redirects them so they come together to form an image on the image sensor 114.

Figure 10:
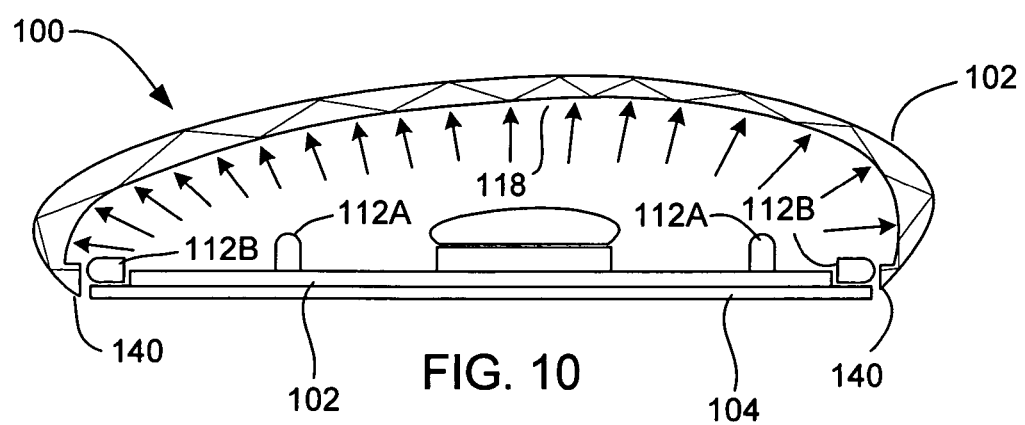
FIG. 10 is a side elevation view of a unibody mouse, in accordance with one embodiment of the present invention.

In yet another alternate embodiment, as shown in FIG. 10, both the inner surface 118 and the edge 140 of the top shell 102 are illuminated. That is, the light emitted by the LEDs 112 is made incident on the inner surface 118 and the inner edge 140 of the top shell 102. In this embodiment, the mouse 100 includes at least a first LED system 112A and a second LED system 112B. The first LED system 112A is configured to generate a first light so as to illuminate the inner surface 118 of the top shell 102 and the second LED system 112B is configured to generate a second light so as to illuminate the inner edge 140 of the top shell 102. With regards to the first LED system 112A, the first light is first made incident on the inner surface of the top shell 102 and then it is directed through the top shell 102 (width wise). With regards to the second LED system 112B, the second light is first made incident on the inner edge of the top shell 102 and then it is directed through the top shell 102 (length wise).

In one embodiment, the edge lighting is performed at different times than the inner surface lighting (different timing). In another embodiment, the edge lighting is performed at the same time as the inner surface lighting.

Figure 11:
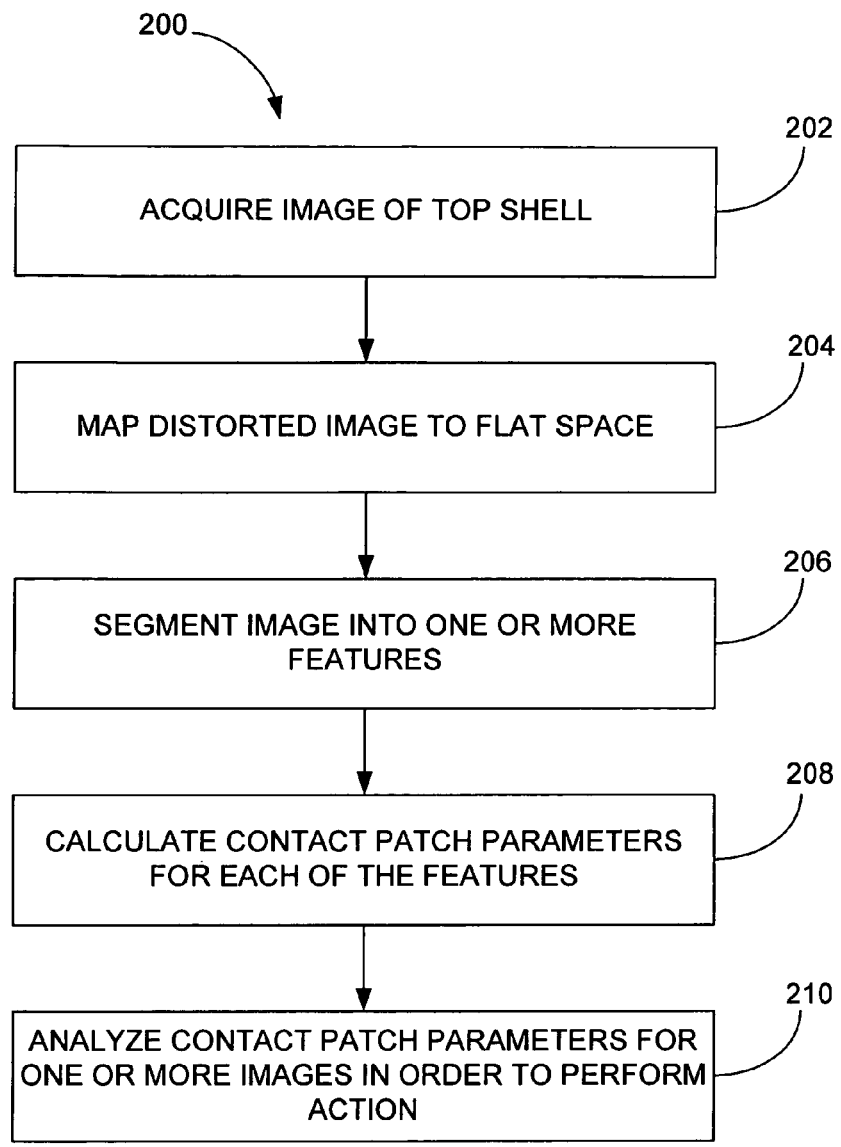
FIG. 11 is a method of operating a mouse as a touch device, in accordance with one embodiment of the present invention.

FIG. 11 is a method 200 of operating a mouse as a touch device, in accordance with one embodiment of the present invention. By way of example, the method may be implemented in any of the mice mentioned above. The method 200 begins at block 202 where an image of the entire or substantially large portion of the top shell is acquired. This may include illuminating the top shell with an illumination source, capturing an image of the top shell with an image sensor such as a CMOS sensor, and turning the illumination off once the image is captured. Turning the illumination source on/off generates some noise filtering. This sequence may be repeated in order to collect a sequence of images. Alternatively, the illumination source may continuously stay on, and the image sensor can either incrementally (snap shots) or continuously image (video) the top shell. Any methods previously described including for example synchronous detection may be used.

Figure 12A:
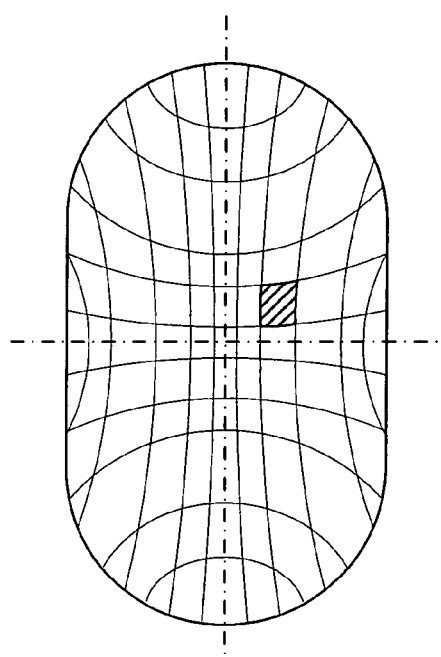
FIG. 12A is an image of a top shell where the area and shape of each pixel within the image may not be accurately represented, in accordance with one embodiment of the present invention.
Figure 12B:
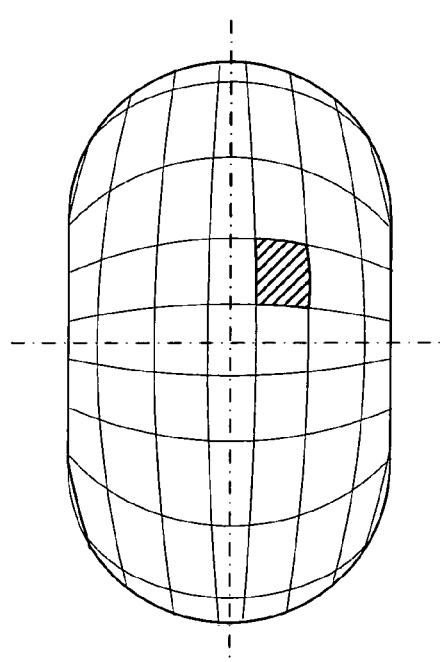
FIG. 12B is an image of a top shell where the area and shape of each pixel within the image may not be accurately represented, in accordance with one embodiment of the present invention.

Unfortunately, trying to image a 3D item in 2D space makes it difficult to correctly image the top shell. For example, because of the unique geometry of the top shell, the image may be distorted or warped. For example, as shown in FIGS. 12A and 12B, the area and shape of each pixel within the image may not be accurately represented (the scale and form of the pixel may be exaggerated or stretched in some places).

Therefore, following block 202, the method 200 proceeds to block 204 where the distorted image is converted or mapped to flat space. This is generally accomplished with a reverse warping transform (which is a high order polynomial used to do mapping).

An example of how de-warping may be implemented will now be described. First the distorted image is divided into a discrete number of polynomials, each describing the function of image columns (x) and image rows (y). For example, the distorted image could be divided into 3 row polynomials, representing the top row, bottom row and the center row in the distorted image relative to the top, center and bottom row of the sensor area, respectively. Similarly, 3 polynomials would represent the left, middle and right column of the image. The number of polynomials for each row/column depends on the highest order occurring in the column/row polynomials. For example, the highest order occurring in the row polynomials would set the highest number of column polynomials. For example, for a key-stoned image, the first order polynomial ydist(x)=mh*x+ydist0 would suffice to describe the top row in the distorted image in respect to the sensor area, whereas mh is the slope of the top edge function of the distorted image and ydist0 is the vertical offset in respect to the sensor origin. Similarly, a first order polynomial xdist(y)=mv*y+xdist0 would suffice to describe the left column in the distorted image in respect to the sensor area. Therefore to find a pixel in distorted space that maps to the sensor area (x,y) one would apply the above polynomials to get location (xdist,ydist). To obtain pixel-mapping information for image columns and/or rows whose functions are not defined by polynomials, interpolation techniques are utilized to obtain mapping information for areas enclosed by two adjacent row/column polynomials by interpolating between the associated polynomials.

Once the image has been corrected, the method 200 proceeds to block 206 where the corrected image is segmented into one or more features, each of which represents a discrete touch point on the top shell as for example from a finger. This may be accomplished with a watershed transform that forms catchment basins and watershed lines in an image by treating it as a surface where light pixels are high points and dark pixels are low points. See for example FIG. 14 discussed below.

Figure 13:
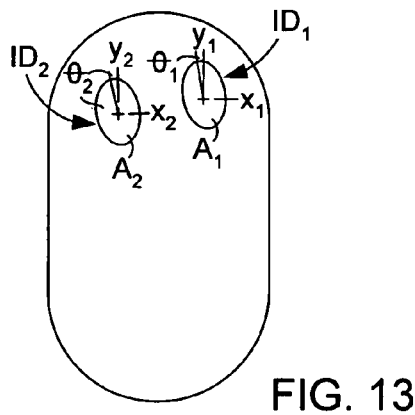
FIG. 13 illustrates a particular image in time, in accordance with one embodiment of the present invention.

Following block 206, the method 200 proceeds to block 208 where contact patch parameters for each of the features are calculated. The contact patch parameters include for example a unique identifier (ID), x coordinate, y coordinate, Z magnitude, angle θ, area A, and the like. By way of example, FIG. 13 illustrates a particular image 220 in time. In image 220, there are two features 222 based on two distinct touches. The touches may for example be formed from a pair of fingers touching the top shell. As shown, each feature 222 includes unique identifier (ID), x coordinate, y coordinate, Z magnitude, angle θ, and area A. More particularly, the first feature 222A is represented by $ID_1, x_1, y_1, Z_1, \theta_1, A_1$ and the second feature 222B is represented by $ID_2, x_2, y_2, Z_2, \theta_2, A_2$.

Following block 208, the method 200 proceeds to bock 210 where the contact patch parameters are sent to a host device so that actions can be performed. The host device may for example implement multipoint processing where feature classification and groupings are performed. During classification, the identity of each of the features is determined. For example, the features may be classified as a particular finger, thumb, palm or other object. Once classified, the features may be grouped. The manner in which the groups are formed can widely varied. In most cases, the features are grouped based on some criteria (e.g., they carry a similar attribute). For example, features may be grouped together because the features are located in close proximity to each other.

The grouping may include some level of filtering to filter out features that are not part of the touch event. In filtering, one or more features may be rejected because they either meet some predefined criteria or because they do not meet some criteria. By way of example, one of the features may be classified as a palm located at the back of the top shell. Because the palm is simply resting on the mouse rather than being used to perform a task, the feature generated therefrom is rejected, i.e., is not considered part of the touch event being processed.

Thereafter, multipoint processing may include calculating key parameters for the feature groups. The key parameters may include distance between features, x/y centroid of all features, feature rotation, total pressure of the group (e.g., pressure at centroid), and the like. The calculation may include finding the centroid C, drawing a virtual line to each feature from the centroid C, defining the distance D for each virtual line ($D_1$ and $D_2$), and then averaging the distances $D_1$ and $D_2$. Once the parameters are calculated, the parameter values are reported. The parameter values are typically reported with a group identifier (GID) and number of features within each group.

In most cases, both initial and current parameter values are reported. The initial parameter values may be based on set down, i.e., when the user sets their fingers on the top shell, and the current values may be based on any point within a stroke occurring after set down. As should be appreciated, these steps are repetitively performed during a user stroke thereby generating a plurality of sequentially configured signals. The initial and current parameters can be compared in later steps to perform actions in the system. For example, one or more actions can be performed based on differences between initial and current parameter values.

In one embodiment, once a group of features is determined, a determination is made as to whether or not the number of features in the group of features has changed. For example, the number of features may have changed due to the user picking up or placing an additional finger. Different fingers may be needed to perform different controls (e.g., tracking, gesturing). If the number of features has changed, the initial parameter values are calculated. If the number stays the same, the current parameter values are calculated. Thereafter, the initial and current parameter values are reported. By way of example, the initial parameter values may contain the average initial distance between points (or Distance (AVG) initial) and the current parameter values may contain the average current distance between points (or Distance (AVG) current).

These may be compared in subsequent steps in order to control various aspects of a computer system.

The above methods and techniques can be used to implement any number of GUI interface objects and actions. For example, gestures can be created to detect and effect a user command to resize a window, scroll a display, rotate an object, zoom in or out of a displayed view, delete or insert text or other objects, etc. Gestures can also be used to invoke and manipulate virtual control interfaces, such as volume knobs, switches, sliders, handles, knobs, doors, and other widgets that may be created to facilitate human interaction with the computing system. Examples of gestures can be found in U.S. patent application Ser. Nos. 10/903,964 and 11/038,590.

Figure 14:
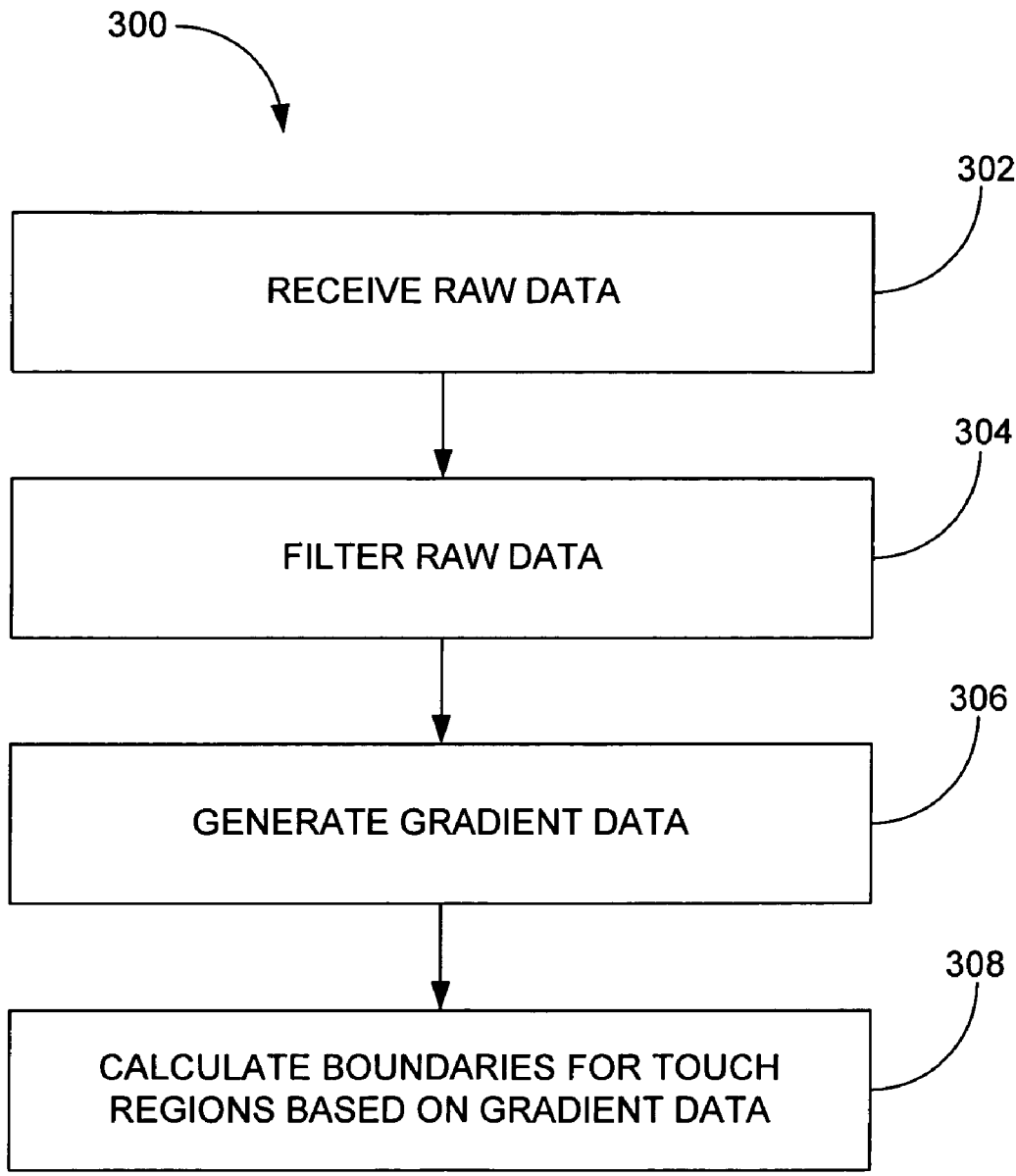
FIG. 14 is a method of segmenting an image, in accordance with one embodiment of the present invention.

FIG. 14 is a method 300 of segmenting an image, in accordance with one embodiment of the present invention. By way of example, the method may generally correspond to block 206 shown and described in FIG. 11. The method 300 generally begins at block 302 where the raw data is received. The raw data is typically in a digitized form, and includes values for each node of the image sensor. The values may be between 0 and 256 where 0 equates to the lowest light level (no touch) and 256 equates to the highest light level (full touch pressure). In one example, the values for each point are provided in gray scale where points with the highest light level are shown in white and the points with lowest light level are shown in black and the points found between are shown in various grades of gray.

Following block 302, the method proceeds to block 304 where the raw data is filtered. As should be appreciated, the raw data typically includes some noise. The filtering process is configured to reduce the noise. By way of example, a noise algorithm may be run that removes points that aren't connected to other points. Single or unconnected points generally indicate noise while multiple connected points generally indicate one or more touch regions, which are regions of the top shell that are touched by objects. In filtered data, the single scattered points have been removed thereby leaving several concentrated areas.

Following block 304, the process flow proceeds to block 306 where gradient data is generated. The gradient data indicates the topology of each group of connected points. The topology is typically based on the light values for each point. Points with the lowest values are steep while points with the highest values are shallow. As should be appreciated, steep points indicate touch points that occurred with greater pressure while shallow points indicate touch points that occurred with lower pressure.

Following block 306, the process flow proceeds to block 308 where the boundaries for touch regions are calculated based on the gradient data. In general, a determination is made as to which points are grouped together to form each touch region. In one embodiment, the boundaries are determined using a watershed algorithm. Once the boundaries are determined, the image can be converted to features.

An example of segmenting an image can be found in U.S. patent application Ser. No. 10/840,862, which is herein incorporated by reference.

Figure 15:
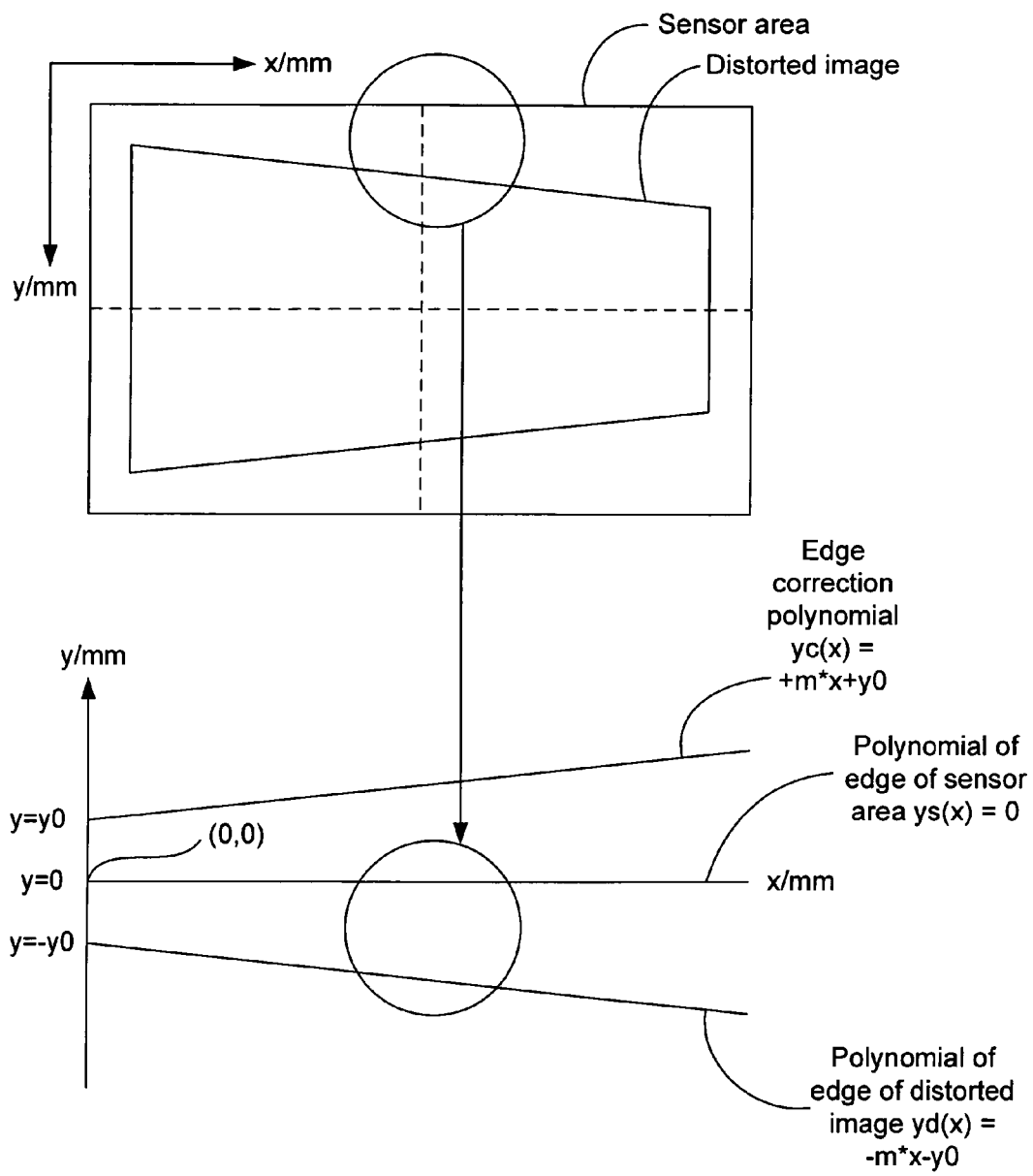
FIG. 15 is a diagram illustrating one example of de-warping, in accordance with one embodiment of the present invention.

FIG. 15 is a diagram illustrating one example of de-warping, in accordance with one embodiment of the present invention. In this example, the distorted image is mapped edge to the edge of the sensor area using the formula yd(x)+yc(x)=ys(x). The correction polynomial is therefore yc(x)=ys(x)−yd(x)=+mx+y0. For mapping of any point in the distorted image to the sensor area, multiple horizontal and vertical polynomials are needed and mapping is accomplished by interpolation between adjacent vertical and horizontal polynomials. The number of horizontal and vertical polynomials is dependent on the order of the distortion function.

Figure 16:
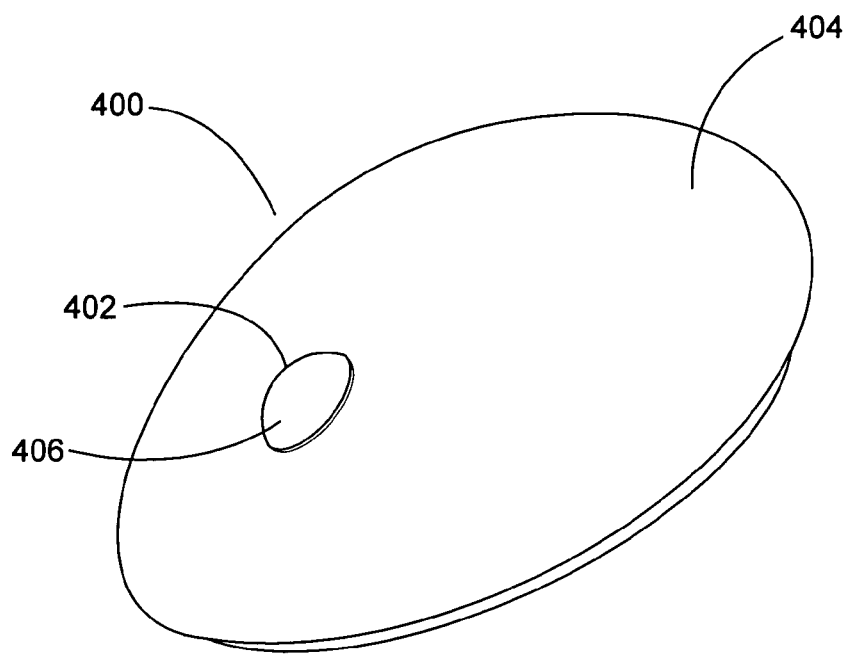
FIG. 16 is a diagram of a mouse including an input mechanism, in accordance with one embodiment of the present invention.

FIG. 16 is a diagram of a mouse 400 including an input mechanism 402, in accordance with one embodiment of the present invention. Unlike the touch sensing surface of the top shell described above, the input mechanism 402 is built into the top shell 404 of the mouse 400 and includes a touch sensing unit that is supported by a force feedback unit (not shown in this diagram).

The touch sensing unit includes a touch sensitive surface 406 for generating inputs to be used by a host device. The force feedback unit, on the other hand, is configured to produce force feedback at the touch sensitive surface 406 in response to inputs generated by the touch sensitive surface 406. The user therefore knows when the input device 402 has performed an input function (e.g., sent a command to the host device). The force feedback may even vary according to the type of input being made. For example, the force feedback may be regional according to where the touch sensitive surface is touched or its intensity may be adjusted according to the force being applied to the touch sensitive surface 406.

The size and shape of the input mechanism 402 can be widely varied. It may cover an extended area or it may be the size of a finger or two (e.g., similar to a scroll wheel). Furthermore, it may be flat or it may protrude out of the mouse surface. Moreover, the input mechanism 402 can be positioned anywhere on the top 404 shell including top, front, side and back surfaces. In most cases, and as shown, the input mechanism 402 is placed on the top front surface so that it can be easily manipulated by a finger when the mouse 400 is held inside a user's hand. Although on the front top surface, it may be located on the right, left or middle of the front top surface. For example, it may be located in the middle of the front top surface so as not to interfere with left and right buttons.

In one embodiment, the touch sensing unit is based on optical sensing. For all intensive purposes, the touch sensing unit may function similarly to the optical imaging system and methods described above. For example, the touch sensing unit may include an optical imaging system for imaging one or more fingers on the touch sensitive surface, and control circuitry for generating inputs into a host device based on the images. Also similarly to the above, the inputs may be used for button events, scroll events, tracking events and/or gesture events. Alternatively, the touch sensing unit may be based on other touch sensing technologies including for example resistive, capacitive, and the like.

Figure 17:
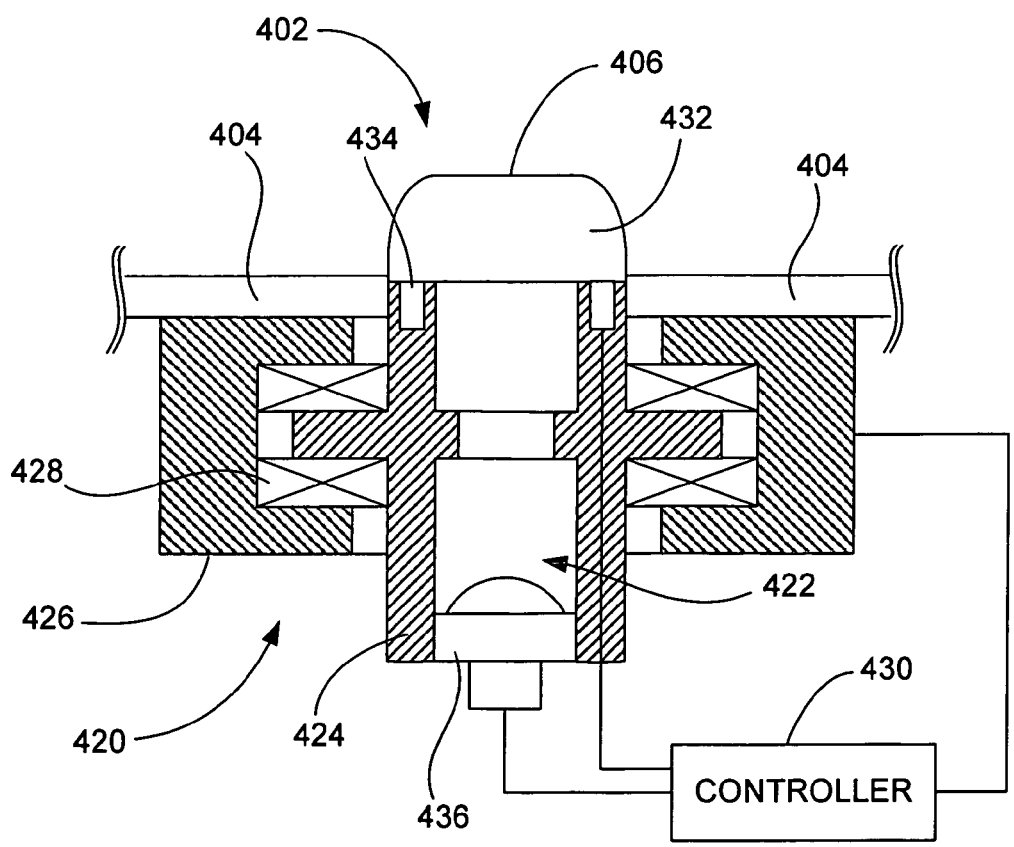
FIG. 17 is a side elevation view, in cross section, of an input mechanism that can be built into a mouse, in accordance with one embodiment of the present invention.

FIG. 17 is a side elevation view, in cross section, of the input mechanism 402 built into a mouse 400, in accordance with one embodiment of the present invention. The input mechanism 402 includes a force feedback unit 420 that is mounted to the top shell 404 of the mouse 400, and an optical imaging system 422 that is supported by the force feedback unit 420.

The force feedback unit 422 is configured to provide force feedback to the optical imaging system 420. The force feedback unit 422 includes a housing 424 made of a ferro-magnetic material and a voice coil 426. The housing 424 is suspended within the voice coil 426 via a tension spring 428. The voice coil 426 is operatively coupled to a controller 430 as for example the controller of the mouse 400. The controller 430 is therefore capable of sending commands to the voice coil 426.

The optical imaging device 422 is configured to performing touch sensing operations. The optical imaging device 422 includes a lens assembly 432, a light source 434 and an image sensor 436. The light source 434 is configured to illuminate the lens assembly 432, and the lens assembly 432 is configured to direct reflected light onto the image sensor 436. The lens assembly 432 generally extends above the top shell 404 and includes a rounded dome like shape. In essence, the arrangement operates similar to the embodiments described above except that the lens assembly 432 combines the function of the top shell and the lens described in the previous embodiments. The light source 434 and image sensor 436 are operatively coupled to the controller 430 as for example the controller of the mouse 400. The controller 430 therefore is capable of sending commands to the light source 434 and image sensor 436 as well as receiving data from the image sensor 436.

During operation, the controller 430 causes the light source 434 to illuminate the lens assembly 432 in a controlled manner. The controller 430 also directs the image sensor 436 to image or take snap shot (referred to as frames) of the lens assembly 432 when the lens assembly 432 is illuminated. This is typically performed at regular intervals to produce consecutive frames. If a finger is present, the light is reflected into the lens assembly 432 and projected onto the image sensor 436. As a result, the image sensor 436 produces an image of the finger relative to its location on the lens assembly 432. At each interval, the controller 430 extracts the image data from the sensor 436 and generates touch characteristics associated with the image. The controller 430 then compares the touch characteristics of subsequent frames to determine such things as whether or not the finger is in motion (tapping or sliding across the surface), and if in motion the characteristics of the motion (e.g., speed). This information can then be used to drive inputs such as button inputs, scroll inputs, tracking inputs, gesture inputs, and the like. This information can also be used to drive the force feedback unit 420. For example, the controller 430 in conjunction with the touch characteristics may create suitable force feedback by driving the voice coil 426, which stimulates the housing 424 and thus the lens assembly 432 attached thereto. This provides physical (haptic) feedback to the user's finger.

Alternatively, the optical imaging system may use a laser interferometer based sensor. In this embodiment, a reference beam is mixed with the reflected light, which results in a beam pattern whose frequency and amplitude is dependent on the magnitude of the displacement of the finger on the sensing surface.

While this invention has been described in terms of several preferred embodiments, there are alterations, permutations, and equivalents, which fall within the scope of this invention. It should also be noted that there are many alternative ways of implementing the methods and apparatuses of the present invention. t is therefore intended that the following appended claims be interpreted as including all such alterations, permutations, and equivalents as fall within the true spirit and scope of the present invention.

What is claimed is:

1. A configurable mouse with an extended sensing surface, which provides the mouse a customizable, programmable or adaptable way of generating inputs, the mouse including an arbitrarily shaped grippable member having a 3D shape, a position detection mechanism that detects the movement of the mouse along a surface, a multipoint touch detection mechanism that includes a single lens assembly and detects one or more objects that are contacting or in close proximity to a majority portion of the grippable member, and a controller for processing signals generated by the position detection mechanism and multipoint touch detection mechanism.

2. The configurable mouse as recited in claim 1 wherein the grippable member includes no fixed input areas.

3. The configurable mouse as recited in claim 1 wherein the grippable member is formed from a single member with a full continuous surface, which defines the front, sides, back and top surfaces of the mouse.

4. The configurable mouse as recited in claim 1 wherein the controller working in conjunction with the touch detection mechanism generates touch data based on the position and motion of the objects contacting or in close proximity to the majority portion of the grippable member, and wherein the touch data is converted to commands to be used by a host device operatively coupled to the mouse.

5. The configurable mouse as recited in claim 4 wherein a command generator identifies one or more hand positions or motions from the touch data and generates a command based on the identified hand position or hand motion.

6. The configurable mouse as recited in claim 1 wherein the grippable member is formed from an optically transmissive material, and wherein the multipoint touch detection mechanism is configured to optically image the majority portion of the grippable member, the multipoint touch detection mechanism including a light arrangement and an imaging arrangement that communicate with the controller, which directs the light arrangement to emit light into the grippable portion and the image arrangement to capture images of the majority portion of the grippable portion and any object interacting therewith in a controlled manner.

7. A method of operating a mouse coupled to a host device such as a personal computer, the method comprising:
    obtaining through a single lens assembly images of a hand as it interacts with a majority portion of an arbitrarily shaped mouse housing;
    obtaining touch patterns for each image;
    extracting control information from the resulting touch patterns; and
    controlling some aspect of a host device based on the control information.

8. The method as recited in claim 7 wherein obtaining images includes:
    illuminating the arbitrarily shaped mouse housing formed from an optically transmissive material; and
    optically imaging the arbitrarily shaped mouse housing when it is illuminated.

9. The method as recited in claim 7 wherein obtaining touch patterns includes:
    correcting each of the images; and
    locating distinct elements within each of the images.

10. The method as recited in claim 7 wherein extracting control information includes:
    identifying discrete touches within the touch patterns;
    assigning a function to touches and touch events associated with the touches;
    monitoring each touch to determine if a touch event has been performed; and
    generating control information based on the assigned function and the touches and touch events.

11. The method as recited in claim 10 wherein monitoring each touch includes:
    obtaining a first set of touch characteristics for a particular touch;
    obtaining a second set of touch characteristics for the particular touch;
    comparing the first and second set of touch characteristics to determine if a touch event has been performed; and
    obtaining characteristics associated with the touch event when a touch event has been performed.

12. A computer mouse, comprising
a mouse housing for enclosing mouse electronics and including a top shell that is connected to a base, the base being embodied as a flat member capable of traveling across a flat surface, the top shell being embodied as a single 3D shaped member that fits inside a user's hand and that is optically transmissive, the base defining the bottom surface of the mouse, the top shell defining the top, front, back and side surfaces of the mouse; and
a mouse tracking unit for tracking movements of the mouse along a flat surface;
an optical image system for imaging a majority portion of the 3D shaped top shell, the optical imaging system including an illumination source for illuminating the 3D shaped top shell, an image sensor arrangement for imaging the 3D shaped top shell when the 3D shaped top shell is illuminated, and a single lens assembly that allows the majority portion of the 3D shaped top shell to be imaged by the image sensor arrangement, the illumination source including one or more light sources, the image sensor arrangement including one or more image sensors;
a controller operatively coupled to the mouse tracking unit and optical imaging system, and configured to control the operations of the mouse tracking unit and the optical imaging system, the controller including a mouse tracking module associated with the mouse tracking unit and an optical sensing module associated with the optical imaging system.

13. The mouse as recited in claim 12 wherein the optical image system images the entire top shell.

14. The mouse as recited in claim 12 wherein the illumination also colorizes the top shell.

15. The mouse as recited in claim 12 wherein the image sensor arrangement includes a single image sensor.

16. The mouse as recited in claim 12 wherein the image sensor is a VGA CMOS image sensor.

17. The mouse as recited in claim 12 wherein the controller is a digital signal processor.

18. The mouse as recited in claim 12 wherein the controller converts the images produced from the optical imaging system to touch data and sends the touch data to a host device.

19. The mouse as recited in claim 18 wherein input commands are extracted from the touch data.

20. The mouse as recited in claim 12 wherein the controller is configured to segment the image into discrete points.

21. The mouse as recited in claim 12 further comprising:
a feedback system operatively coupled to the controller, and configured to provide feedback to the user of the mouse so that the user is able to positively confirm that a user action has resulted in an input, the feedback system including one or more feedback generators selected from audio feedback device and haptics devices.

22. The mouse as recited in claim 21 wherein the top shell and base are interconnected by means of a haptics device.

23. The mouse as recited in claim 12 wherein the light sources illuminate an inner surface of the top shell.

24. The mouse as recited in claim 12 wherein the light sources illuminate an edge of the top shell.

25. The mouse as recited in claim 12 wherein the light sources illuminate an inner surface of the top shell and an edge of the top shell.

26. The mouse as recited in claim 12 wherein the mouse further includes a light diffuser configured to diffuse the light being emitted by the light sources.

27. A method of inputting from a mouse into a host device, comprising:
at the mouse, imaging through a single lens assembly the entire or majority portion of a 3D shaped top shell of a mouse;
at the mouse, mapping the 3D image to flat space;
at the mouse, segmenting the flat space image into one or more features, each of which represents a discrete touch on the surface of the top shell;
at the mouse, calculating contact patch parameters for each of the features; and
at the mouse, sending the contact patch parameters to the host device so that actions can be performed based on the contact patch parameters.

28. The method as recited in claim 27 wherein the contact patch parameters include identifiers, coordinates and area.

29. The method as recited in claim 27 further comprising:
at the host, extracting command data from the contact patch parameters.

30. The method as recited in claim 29 the command data being selected from buttoning, tracking, scrolling, rotating, paging, and sizing.

31. The mouse as recited in claim 12 wherein the lens assembly comprises a wide angle lens and the controller is configured to convert warped 3D images to flat space.

32. The mouse as recited in claim 12 wherein the lens assembly is configured to perform de-warping.

* * * * *